(12) United States Patent
Rysdyk et al.

(10) Patent No.: US 12,293,673 B2
(45) Date of Patent: May 6, 2025

(54) AIRCRAFT GUIDANCE TO MOVING TARGET POINT

(71) Applicant: THE BOEING COMPANY, Chicago, IL (US)

(72) Inventors: Rolf Rysdyk, Hood River, OR (US); Mohammad Ehsan Nasroullahi, Vancouver, WA (US)

(73) Assignee: THE BOEING COMPANY, Arlington, VA (US)

( * ) Notice: Subject to any disclaimer, the term of this patent is extended or adjusted under 35 U.S.C. 154(b) by 389 days.

(21) Appl. No.: 17/659,070

(22) Filed: Apr. 13, 2022

(65) Prior Publication Data

US 2023/0334992 A1    Oct. 19, 2023

(51) Int. Cl.
*G08G 5/34* (2025.01)
*B64D 25/00* (2006.01)
*G01C 21/34* (2006.01)

(52) U.S. Cl.
CPC .............. *G08G 5/34* (2025.01); *B64D 25/00* (2013.01); *G01C 21/3438* (2013.01)

(58) Field of Classification Search
CPC ... G08G 5/0039; B64D 25/00; G01C 21/3438
See application file for complete search history.

(56) References Cited

U.S. PATENT DOCUMENTS

| | | | |
|---|---|---|---|
| 10,836,509 B2 | 11/2020 | McGrew et al. | |
| 11,034,447 B2 | 6/2021 | Grubb | |
| 2011/0270474 A1* | 11/2011 | Builta | G05D 1/0027 701/7 |

FOREIGN PATENT DOCUMENTS

WO    2022001748 A1    1/2022

OTHER PUBLICATIONS

English Translation of KR 20140112588 A Author: Kim et al. Title: Method of Terminal Guidance of Airplane and Apparatuse for Using the Same Date: Sep. 24, 2014 (Year: 2014).*
English Translation of WO2022001748A1 Title: Target Tracking Method and Apparatus, and Electronic Device and Mobile Carrier Author: Zheng et al. Date: Jan. 6, 2022 (Year: 2022).*
Breivik, Morten et al., "Principles of Guidance-Based Path Following in 2D and 3D," Proceedings of the 44th IEEE Conference on Decision and Control and the European Control Conference, 2005, Seville, Spain, pp. 627-634.

(Continued)

*Primary Examiner* — James J Lee
*Assistant Examiner* — Steven Vu Nguyen
(74) *Attorney, Agent, or Firm* — Moore IP Law

(57) ABSTRACT

A method of guidance for an aircraft includes obtaining relative position data indicative of a direction from a location of the aircraft to a location of a moving target point. The method also includes determining, based on the relative position data, a location of a virtual leader based on projecting the location of the aircraft onto a virtual leader path, where the virtual leader path corresponds to a straight approach path to the location of the moving target point along a desired approach direction. The method further includes determining, based on the location of the virtual leader, a guidance input to cause the aircraft to follow the virtual leader.

20 Claims, 8 Drawing Sheets

(56) References Cited

OTHER PUBLICATIONS

Jantapremjit, P et al., "Control and Guidance Approach Using Autonomous Underwater Vehicle," International Journal of Maritime Engineering, Royal Institution of Naval Architects, 2008, University of Southampton, UK, pp. 1-12.
Kobayashi, Ryo et al., "Leader-following formation navigation with virtual trajectories for dynamic multi-agents," 7th IFAC Symposium on Advances in Automotive Control, The International Federation of Automatic Control, Sep. 4-7, 2018, Tokyo, Japan, pp. 773-779.
Leonard, Naomi Ehrich et al., "Virtual Leaders, Artificial Potentials and Coordinated Control of Groups," Proceedings of 40th IEEE Conference on Decisions and Control, 2011, pp. 2968-2973.
Rysdyk, Rolf, "UAV Path Following for Target Observation in Wind," Department of Aeronautics and Astronautics, University of Washington, Seattle, WA, pp. 1-27.
Saravanakumar, S. et al., "Waypoint Guidance Based Planar Path Following and Obstacle Avoidance of Autonomous Underwater Vehicle," Proceedings of the 8th International Conference on Informatics in Control, Automation and Robotics, 2011, pp. 191-198.
Stolle, Sebastian et al., "Flight Path Following Guidance for Unmanned Air Vehicles with Pan-Tilt Camera for Target Observation," IEEE, 2003, https://www.researchgate.net/publication/4043880, pp. 1-13.
Partial European Search Report for application No. 23165676.0, pp. 1-13.

\* cited by examiner

AIRCRAFT GUIDANCE TO MOVING TARGET POINT

FIELD OF THE DISCLOSURE

The present disclosure is generally related to guidance to direct an aircraft to a moving target point.

BACKGROUND

Path following dynamics of many aircraft (e.g., fixed wing aircraft) are limited due to the inability of such aircraft to move directly laterally. For example, rather than moving directly to the side, such aircraft turn while moving forward (e.g., by rolling to a particular bank angle). This inability to move directly sideward limits some path following capabilities of such aircraft.

For example, when approaching a moving target point along a desired approach path, the aircraft is not able to shift side-to-side in response to the target point moving side-to-side. Rather, if the target point moves to the left, the aircraft generally has to bank to turn toward the left to move toward alignment with the desired approach path and then bank again toward the right to turn into alignment with a desired approach direction. If the location of the target point is dynamic (e.g., frequently or continuously moving), a guidance system of the aircraft may have to continuously or frequently change guidance input resulting in a wildly varying approach to the target point.

SUMMARY

In a particular implementation, a system includes an aircraft, an aircraft recovery device, and a guidance system. The aircraft recovery device is configured to be coupled to a vehicle and configured to recover the aircraft while the vehicle is in motion. The guidance system includes one or more processors. The guidance system is configured to obtain first relative position data indicative of a direction from a first location of the aircraft at a first time to a first location of a moving target point of the aircraft recovery device at the first time. The guidance system is also configured to determine, based on the first relative position data, a first location of a virtual leader based on projection of first aircraft location information onto a first virtual leader path. The first virtual leader path corresponds to a straight approach path to the first location of the moving target point along a desired approach direction. The guidance system is further configured to determine, based on the first location of the virtual leader, a guidance input to cause the aircraft to follow the virtual leader.

In another particular implementation, a method of guidance for an aircraft includes obtaining, at one or more processors of a guidance system, first relative position data indicative of a direction from a first location of the aircraft at a first time to a first location of a moving target point at the first time. The method also includes determining, by the one or more processors based on the first relative position data, a first location of a virtual leader based on projecting the first location of the aircraft onto a first virtual leader path. The first virtual leader path corresponds to a straight approach path to the first location of the moving target point along a desired approach direction. The method further includes determining, by the one or more processors based on the first location of the virtual leader, a guidance input to cause the aircraft to follow the virtual leader.

In another particular implementation, an aircraft includes a guidance system including one or more processors. The guidance system is configured to obtain first relative position data indicative of a direction from a first location of the aircraft at a first time to a first location of a moving target point at the first time. The guidance system is also configured to determine, based on the first relative position data, a first location of a virtual leader based on projection of first aircraft location information onto a first virtual leader path. The first virtual leader path corresponds to a straight approach path to the first location of the moving target point along a desired approach direction. The guidance system is further configured to determine, based on the first location of the virtual leader, a guidance input to cause the aircraft to follow the virtual leader.

The features, functions, and advantages described herein can be achieved independently in various implementations or may be combined in yet other implementations, further details of which can be found with reference to the following description and drawings.

DETAILED DESCRIPTION

Figures 1A, 1B, 1C:
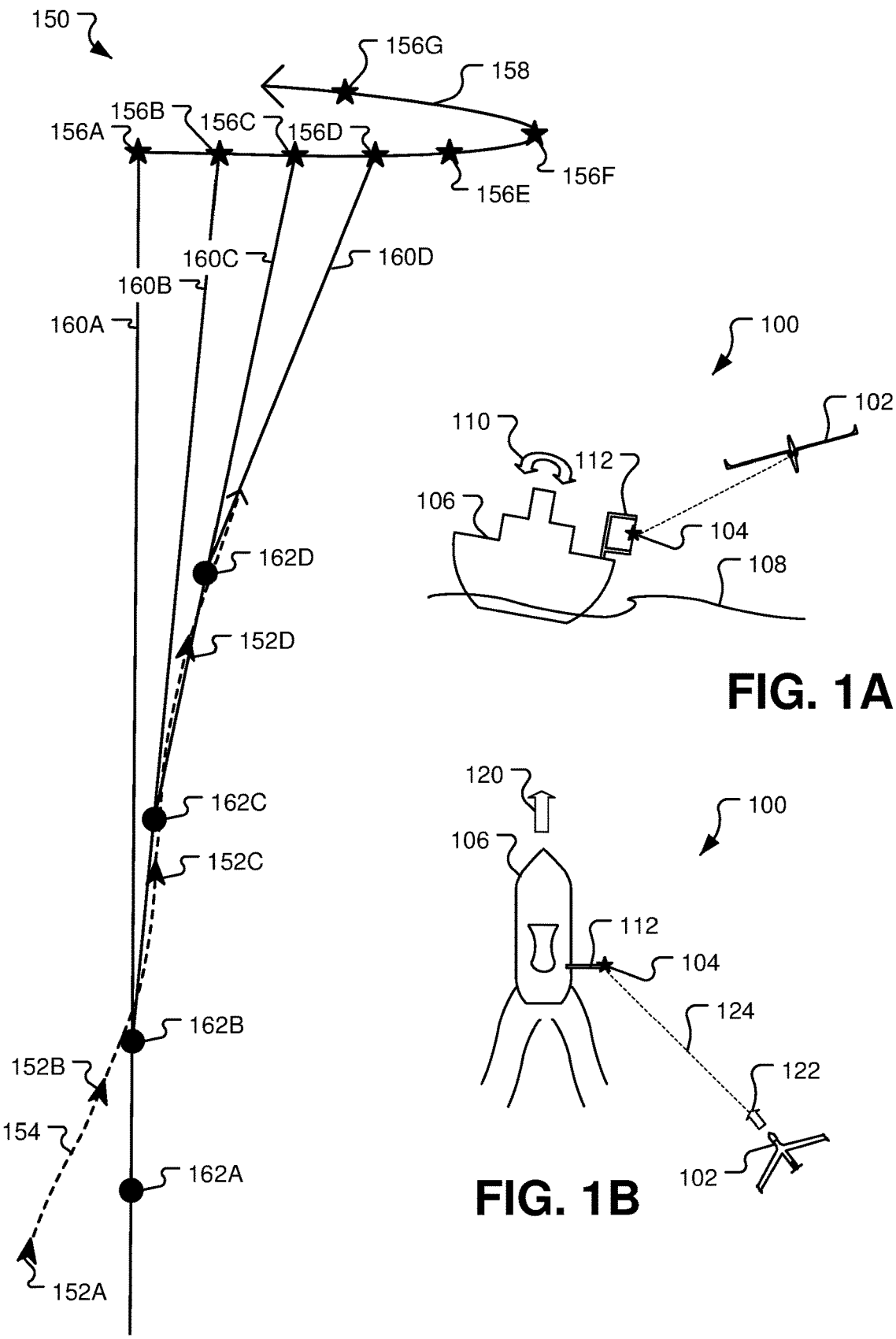
FIG. 1A is a diagram that illustrates a rear view of a system including an aircraft and a moving target point according to a particular aspect.
FIG. 1B is a diagram that illustrates a top view of the system of FIG. 1A according to a particular aspect.
FIG. 1C is a diagram that illustrates aspects of approach of the aircraft of FIGS. 1A and 1B toward the moving target point over a period of time according to a particular aspect.

Aspects of the subject disclosure use path following logic to facilitate approach of an aircraft to a moving target point, such as an aircraft recovery device onboard a moving vehicle. The aircraft may include a fixed wing aircraft or another nonholonomic aircraft, such as a quadcopter. Although the disclosure focuses primarily on aircraft, aspects disclosed herein may also be used to facilitate approach of other vehicles to a moving target point. To illustrate, aspects disclosed herein may be used to facilitate approach of a land craft, such as a car or truck, to a moving target point.

In a particular aspect, the path following dynamics of many aircraft (e.g., fixed wing aircraft and other nonholonomic aircraft) are limited due to the inability of such aircraft to move directly laterally. For example, rather than moving directly to the side, such aircraft turn while moving forward (e.g., by rolling to a particular bank angle). This inability to move directly sideward limits some path following capabilities of such aircraft. One example of such a limitation is an inability to track a meandering path without phase lag. To illustrate, consider a fixed wing aircraft flying along a desired approach direction (e.g., a straight path) toward a target point. If the target point moves to the left, this results in the aircraft being offset from the desired approach path. Put another way, the straight path to the target point has "meandered" away from the current path of the aircraft. Due to the inability to directly move sideward, the aircraft cannot correct for this meandering path by simply shifting directly to the left by the same amount that the target point moved. Rather, the aircraft generally has to bank to turn toward the left then bank again to the right to turn into alignment with the desired approach direction. If the location of the target point is dynamic (e.g., frequently or continuously moving), a guidance system of the aircraft may have to continuously or frequently change guidance input resulting in a wildly varying approach to the target point. One effect of such an approach may be large variations in flight control inputs (e.g., bank angles, etc.). Similar limitations apply to other nonholonomic aircraft, and many common land craft and watercraft that are not able to move directly laterally.

Aspects disclosed herein describe a guidance system that is able to smooth the approach to a moving target point. In a particular aspect, rather than determining guidance input to steer the aircraft directly toward a moving target point, the guidance system disclosed herein determines guidance input for the aircraft to cause the aircraft to follow a "virtual leader". The "virtual leader" is a virtual entity (e.g., not a physical entity) governed by software of the guidance system. The virtual leader follows a straight approach path toward the target point referred to herein as the virtual leader path. The virtual leader path is updated periodically or occasionally to extend between the current location of the virtual leader and the current location of the target point. Since the virtual leader is not a physical entity, it is able to instantaneously change direction when the virtual leader path is updated. Guidance input to the aircraft is determined (e.g., using good helmsman guidance behavior, actual flight dynamics of the aircraft, and environmental conditions (e.g., wind)), to cause the aircraft to follow the virtual leader toward the moving target point. As a result of this arrangement, the guidance inputs to the aircraft can be much less variable and the resulting flight path of the aircraft is much smoother than if the aircraft were continuously trying to fly directly toward the moving target point.

As used herein "guidance laws" describe path following behavior imposed on the aircraft by a guidance system of the aircraft. The guidance system may be onboard the aircraft or remote from the aircraft (e.g., in the case of a remotely piloted aircraft). As used herein "good helmsman guidance behavior" refers to guidance behavior that would be expected from an experienced helmsman, such as implementing course corrections by following an intercept course that varies with cross track error. In a particular aspect, good helmsman guidance behavior is independent of state-estimation and vehicle stabilization.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features is referred to herein, the reference number is used with the distinguishing letter.

Figure 2:
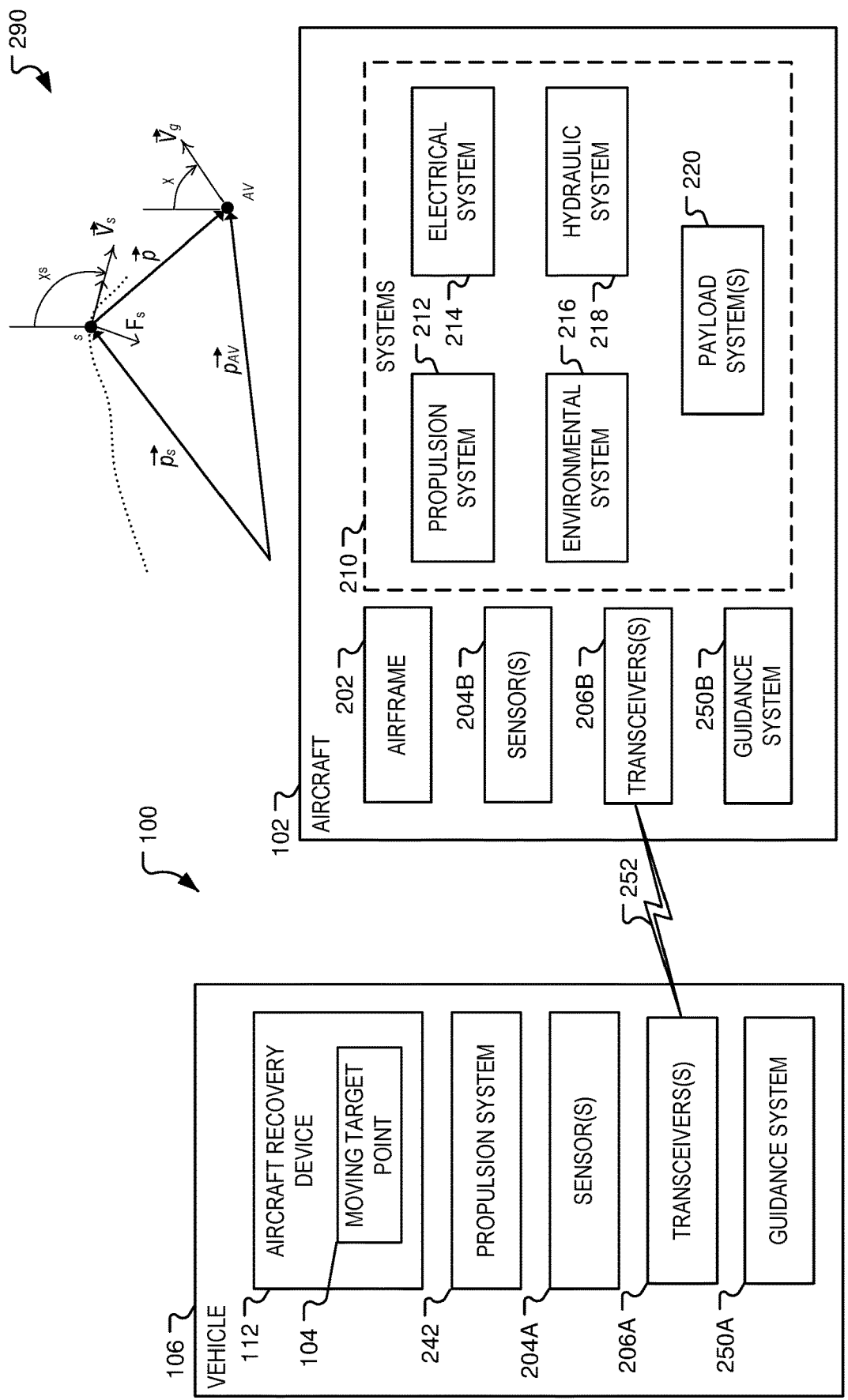
FIG. 2 is a block diagram of aspects of the system of FIGS. 1A and 1B.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 2 depicts an aircraft 102 that includes one or more sensors ("sensor(s)" 204B in FIG. 2), which indicates that in some implementations the aircraft 102 includes a single sensor 204B and in other implementations the aircraft 102 includes multiple sensors 204B.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1A is a diagram that illustrates a rear view of a system 100 including an aircraft 102 and a moving target point 104 according to a particular aspect. FIG. 1B is a diagram that illustrates a top view of the system 100 of FIG. 1A according to a particular aspect. In the particular example illustrated in FIGS. 1A and 1B, the moving target point 104 corresponds to, includes, or is included within (e.g., is a portion of) an aircraft recovery device 112.

The moving target point 104 of FIGS. 1A and 1B is coupled to a vehicle 106 (illustrated in FIGS. 1A and 1B as a ship) that is in motion. The motion of the vehicle 106 includes translation, rotation, or both. To illustrate, as one simplified example, the vehicle 106 may be moving (e.g., traversing) in a forward direction 120 under its own power and moving (e.g., rolling) in a side-to-side direction 110 due to the influence of waves 108. In other examples, the motion of the vehicle 106 may be more irregular and may be influenced by other factors. To illustrate, currents within water may move the vehicle 106 in a direction that is not aligned with its fore-aft axis, waves may cause rotation about a pitch axis of the vehicle 106 or even translation along a yaw axis of the vehicle 106. Further, such motion may be fairly regular (e.g., periodic) in some circumstances and quite irregular (e.g., chaotic) in other circumstances.

At the specific instance in time illustrated in FIGS. 1A and 1B, a flight path 122 of the aircraft 102 is arranged to cause the aircraft 102 to approach the moving target point 104 along a desired approach direction 124. FIG. 1C is a diagram 150 that illustrates aspects of the approach of the aircraft 102 of FIGS. 1A and 1B toward the moving target point 104 over a period of time. In FIG. 1C, letters "A"-"G" are used with reference numbers to denote different instances in time. For example, each reference number of FIG. 1C that includes the letter "A" represents a first time ($T_1$), each reference number of FIG. 1C that includes the letter "B" represents a second time ($T_2$) that is subsequent to the first time ($T_1$), each reference number of FIG. 1C that includes the letter "C" represents a third time ($T_3$) that is subsequent to the second time ($T_2$), and so forth. To illustrate, reference number "156A" represents a location of the moving target point 104 at the first time ($T_1$), and reference number "156B" represents a location of the moving target point 104 at the second time ($T_2$). Likewise, reference number "152A" represents a location of the aircraft 102 at the first time ($T_1$), and reference number "152B" represents a location of the aircraft 102 at the second time ($T_2$).

Figure 5:
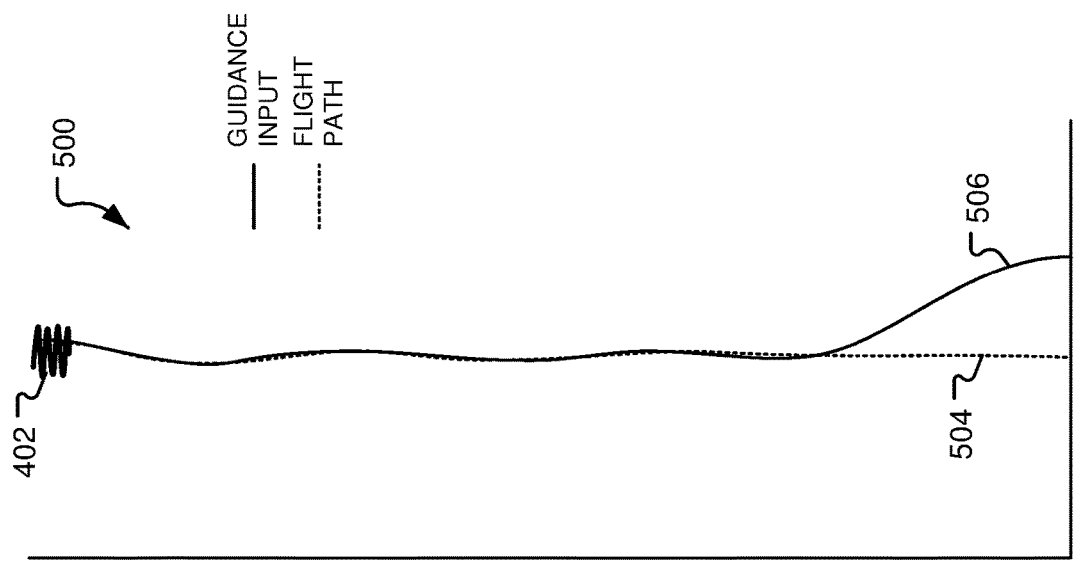
FIG. 5 is a second diagram that illustrates a flight path and guidance input of an aircraft approaching a moving target according to a particular aspect.
Figure 4:
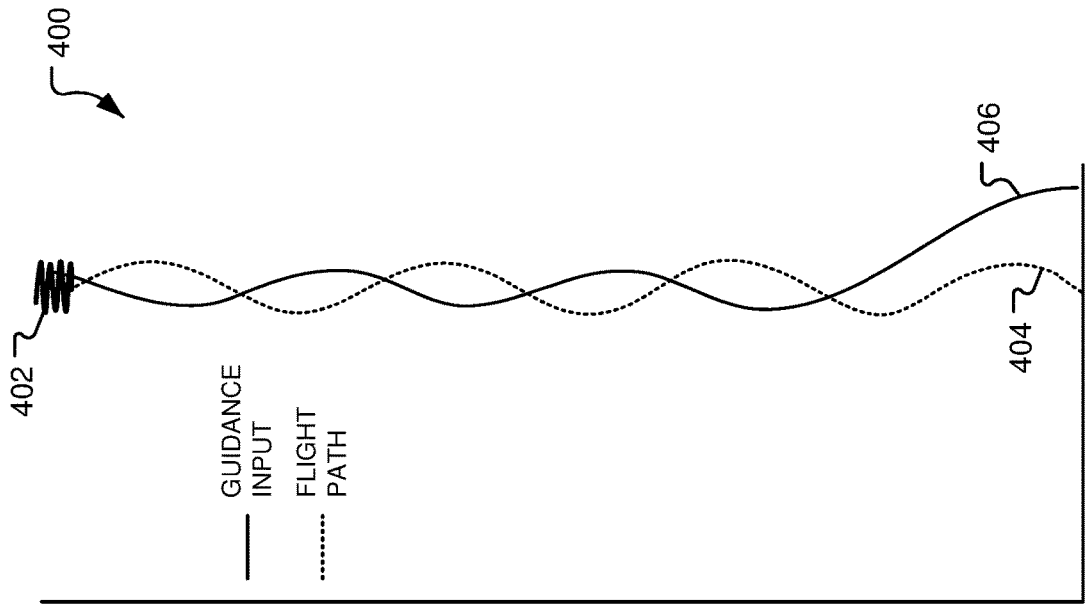
FIG. 4 is a first diagram that illustrates a flight path and guidance input of an aircraft approaching a moving target.

FIG. 1C illustrates a pattern 158 of movement of the moving target point 104 over a period of time. The pattern 158 shown in FIG. 1C is merely illustrative of one particular and non-limiting circumstance. In other circumstances, the moving target point 104 moves in a different pattern (or with no readily discernable pattern) rather than according to the pattern 158. FIG. 1C also shows locations 156A-156G of the moving target point 104 at various times. Note that the magnitude of the movement of the moving target point 104 in FIGS. 1A-1C is somewhat exaggerated relative to a typical approach in order to highlight aspects of the disclosure. A more typical relative scale is illustrated in FIGS. 4 and 5.

FIG. 1C also illustrates an approach path 154 of the aircraft 102 over the period of time. The approach path 154 shown in FIG. 1C is merely illustrative of one particular and non-limiting circumstance. FIG. 1C also shows locations 152A-152D of the aircraft 102 along the approach path 154 at various times.

Figure 3C:
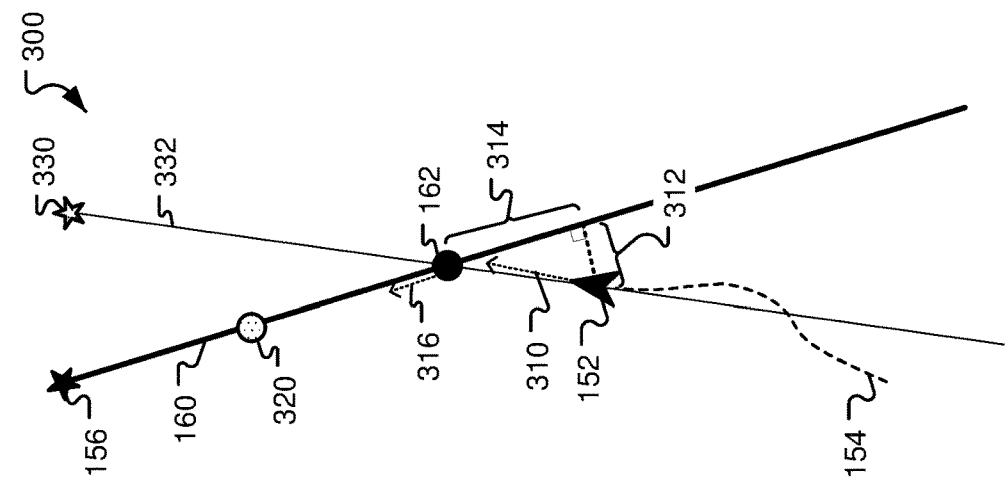
FIG. 3C is a diagram illustrating aspects of the approach of the aircraft of FIGS. 1A and 1B toward the moving target point at a third time subsequent to the second time of FIG. 3B according to a particular aspect.
Figure 3B:
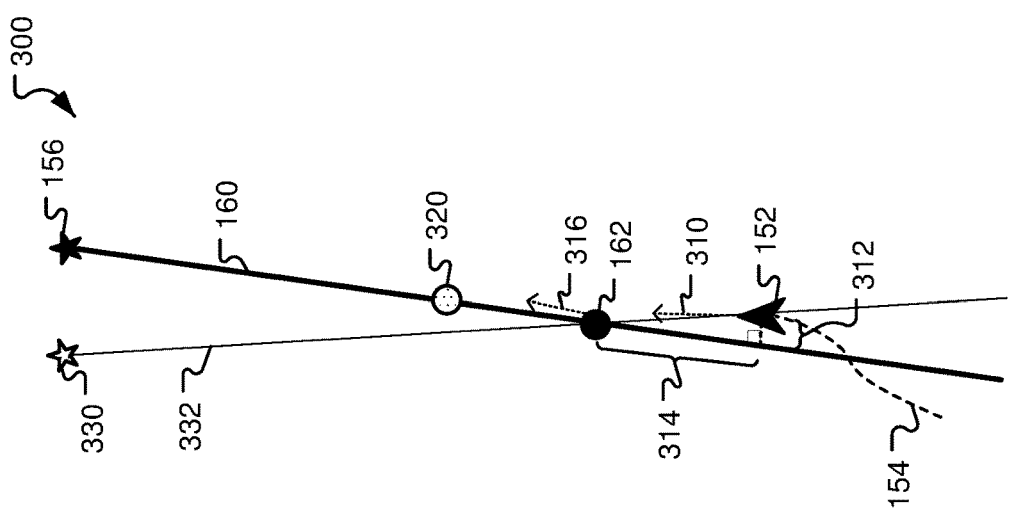
FIG. 3B is a diagram illustrating aspects of the approach of the aircraft of FIGS. 1A and 1B toward the moving target point at a second time subsequent to the first time of FIG. 3A according to a particular aspect.
Figure 3A:
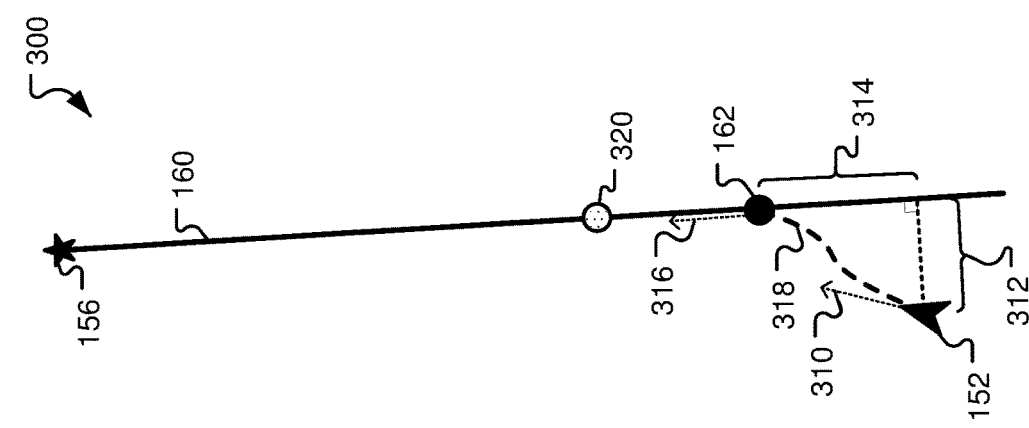
FIG. 3A is a diagram illustrating aspects of the approach of the aircraft of FIGS. 1A and 1B toward the moving target point at a first time according to a particular aspect.

FIG. 1C further illustrates a plurality of virtual leader paths 160A-160D over the period of time. The virtual leader paths 160A-160D shown in FIG. 1C are merely illustrative of one particular and non-limiting circumstance. FIG. 1C also shows locations 162A-162D of a virtual leader along respective ones of the virtual leader paths 160A-160D at various times. As explained above, the virtual leader is a virtual (e.g., non-physical entity). The location 162 of the virtual leader at any particular time is determined by a guidance system associated with the aircraft 102. FIGS. 3A-3C describe one example of how the location of the virtual leader is determined.

The virtual leader always follows a respective one of the virtual leader paths 160A-160D (e.g., whichever of the virtual leader paths 160A-160D is active at the particular time). The virtual leader path 160 at any particular time extends between the location 162 of the virtual leader at the particular time and the most recent location 156 of the moving target point 104. The virtual leader path 160 is updated periodically or occasionally, such as whenever new position data updating the location 156 of the moving target point 104 is received by the guidance system. For example, update information may be received at the guidance system indicating that the moving target point 104 is at the location 156B. At the second time (T2), the virtual leader is on the first virtual leader path 160A at location 162B (based on tracking calculations performed by the guidance system). Based on the update information, the guidance system determines the second virtual leader path 160B, which extends directly between the location 162B of the virtual leader and the location 156B of the moving target point 104. Following this update, the virtual leader proceeds directly along the second virtual leader path 160B. Likewise, at the third time (T3), additional update information may be received at the guidance system indicating that the moving target point 104 is at the location 156C. Based on the additional update information, the guidance system determines the third virtual leader path 160C, which extends directly between the location 162C of the virtual leader and the location 156C of the moving target point 104.

Since movement of the virtual leader is not subject to physical constraints, such as inertia and flight dynamics, the virtual leader is able to instantaneously change to any new virtual leader path 160 when an update occurs. The aircraft 102, however, is subject to physical constraints and is unable to instantaneously change direction, speed, etc. The guidance system controls the aircraft 102 to cause the aircraft 102 to follow the virtual leader according to specified guidance laws. The guidance laws account for flight dynamics of the aircraft as well as other constraints, such as operational or procedural limits. Additionally, in a particular aspect, the guidance laws enforce good helmsman guidance behavior, such as implementing course corrections by following an intercept course that varies with cross track error.

As explained in more detail below, one result of causing the aircraft 102 to follow the virtual leader is a smoothing of the approach path 154 of the aircraft 102 toward the moving target point 104. Due to this effect, the techniques described with reference to FIG. 1C may be referred to as "geometric smoothing" (e.g., smoothing of the geometry of the approach path 154). One result of such geometric smoothing is that, generally, more conservative flight control inputs are used along the approach path 154 than would be used if the aircraft 102 constantly attempted to fly directly toward the moving target point 104. For example, the aircraft 102 may be subjected to fewer steep bank angle turns as it traverses the approach path 154. Further, simulation has shown that geometric smoothing tends to cause the aircraft 102 to more accurately engage the moving target point 104 (e.g., to have a smaller average miss distance, as explained further with reference to FIG. 5).

Although FIGS. 1A and 1B illustrate the moving target point 104 coupled to a ship resulting in movement of the moving target point 104 due to wind, current, waves, and ship propulsion, in other implementations, the moving target point 104 moves due to other influences. For example, in a particular aspect, the moving target point 104 may be coupled to a second aircraft which the aircraft 102 is approaching. In this example, motion of the moving target point 104 may be due to propulsion and guidance inputs of the second aircraft, wind, turbulence, etc. As another example, in a particular aspect, the moving target point 104 may be coupled to a land craft which the aircraft 102 is approaching. In this example, motion of the moving target point 104 may be due to movement of the land craft over an uneven surface.

In the example illustrated in FIGS. 1A and 1B, the aircraft recovery device 112 includes a line that extends vertically from or within a frame. In this example, the aircraft 102 includes a hook or other catch member (e.g., proximate to each wingtip) that is configured to engage the line to enable the aircraft recovery device 112 to catch and retain the aircraft 102. In other examples, the moving target point 104 corresponds to, includes, or is included within (e.g., is a portion of) another type of aircraft recovery device, such as a net, a platform, a basket, etc. In still other examples, the moving target point 104 corresponds to, includes, or is included within a device other than an aircraft recovery device 112, such as a fuel receptacle of a refueling boom.

FIG. 2 is a block diagram illustrating aspects of the system 100 of FIGS. 1A and 1B. In particular, FIG. 2 depicts aspects of the aircraft 102 and depicts aspects of the vehicle 106 according to a particular implementation. The aircraft 102 and the vehicle 106 are simplified in FIG. 2 to highlight particular features.

In FIG. 2, the aircraft 102 includes an airframe 202 and a plurality of systems 210. In the particular example illustrated in FIG. 2, the systems 210 include one or more of a propulsion system 212, an electrical system 214, an environmental system 216, a hydraulic system 218, and one or more payload systems 220. In various examples, the propulsion system 212 includes one or more engines, one or more motors, other components configured to generate thrust, or a combination thereof.

In various examples, the electrical system 214 includes systems and components to generate, store, distribute, transform, and/or use electrical power. To illustrate, the electrical system 214 may include power distribution circuits, lights, electrically driven actuators (e.g., actuators to move flight controls to implement guidance input), etc.

In various examples, the hydraulic system 218 includes systems and components to pressurize, store, distribute, regulate, and/or use a pressurized fluid. To illustrate, the hydraulic system 218 may include one or more pumps, one or more pressure lines, one or more hydraulically-driven actuators (e.g., actuators to move flight controls to implement guidance input), etc.

In various examples, the payload system(s) 220 includes systems and components to transport a payload (e.g., cargo) and/or systems and components to utilize a payload (e.g., a payload device) during a flight. To illustrate, a payload device may include a weapon system, an electronic countermeasures system, a camera, etc., and the payload system 220 may include mechanical and/or electronic connectors to couple the payload device to the aircraft 102.

In FIG. 2, the vehicle 106 includes the moving target point 104, which in the example of FIG. 2 is part of the aircraft recovery device 112. The vehicle 106 also includes a propulsion system 242. For example, the propulsion system 242 includes one or more engines, one or more motors, other components configured to generate thrust, or a combination thereof.

In FIG. 2, the vehicle 106 and the aircraft 102 are each illustrated as including a guidance system, one or more sensors, and one or more transceivers. For example, the vehicle 106 in FIG. 2 includes a guidance system 250A, one or more sensors 204A, and one or more transceivers 206A, and the aircraft 102 includes a guidance system 250B, one or more sensors 204B, and one or more transceivers 206B.

In the context of FIG. 2, a guidance system 250 (e.g., the guidance system 250A, the guidance system 250B, or both) includes software, hardware, or both (e.g., firmware) that is configured to perform operations to smooth an approach of the aircraft 102 to the moving target point 104. For example, the guidance system 250 of FIG. 2 determines guidance input for the aircraft 102 to cause the aircraft 102 to follow a virtual leader, as described in more detail below and with reference to FIG. 3A-3C. In particular implementations, the guidance system 250 includes one or more processors and one or more memory devices.

The sensor(s) 204 (e.g., the sensor(s) 204A, the sensor(s) 204B, or both) include one or more position sensor(s), which may include global position sensors, relative position sensors, or both. For example, a particular position sensor may be configured to receive transmissions from three or more satellites and to determine the position of the aircraft 102 or the vehicle 106 based on the transmissions. To illustrate, the position sensor(s) may include Global Positioning System (GPS) receivers, Global Navigation Satellite System (GLONASS) receivers, BeiDou Navigation Satellite System (BDS) receivers, or a receiver for another global navigation satellite system.

As another example, the relative position sensor(s) may include one or more passive electromagnetic sensors, one or more active electromagnetic sensors, one or more inertial measurement sensors, etc. A "passive electromagnetic sensor" is a sensor that is configured to detect (and typically quantify) an electromagnetic waveform that originated elsewhere. One example of a passive electromagnetic sensor that can be used to determine relative position is cameras (e.g., stereo-optical cameras) that can be used to determine distance and direction from the cameras to a visually detectable object. Another example of a passive electromagnetic sensor that can be used to determine relative position is a directional antenna array, which can be used to detect an electromagnetic signal (e.g., a beacon) transmitted by another device and to determine a distance and direction to the other device.

An "active electromagnetic sensor" is a sensor that is configured to transmit an electromagnetic waveform and to detect returns based on reflections of the electromagnetic waveform. One example of an active electromagnetic sensor that can be used to determine relative position is a radar system, which emits a radiofrequency signal and determines the distance and direction of an object that reflects the radiofrequency signal. Another example of an active electromagnetic sensor that can be used to determine relative position is a lidar system, which emits a light signal (e.g., a laser beam) and determines the distance and direction of an object that reflects the light signal.

The guidance system(s) 250 (e.g., the guidance system 250A, the guidance system 250B, or both) include one or more processors that are configured to determine guidance input for the aircraft 102 during an approach of the aircraft 102 to the moving target point 104. In a particular implementation, the guidance system 250 uses relative position data from the sensors 204 to determine an approach path to the moving target point 104 and generates the guidance input based on the approach path.

In a particular aspect, the guidance system 250 determines the approach path to follow a virtual leader. The virtual leader is a virtual (non-physical) entity that is tracked by the guidance system 250. The guidance system 250 assigns an initial location, direction, and speed to the virtual leader, and subsequently tracks the location of the virtual leader over time. The movement of the virtual leader is always along a virtual leader path which is a straight approach path to the moving target point along a desired approach direction. For purposes of tracking the virtual leader, the location of the moving target point may be estimated. For example, a last known location of the moving target point 104 may be used and updated when new location information for the moving target point 104 becomes available. As another example, a predicted location of the moving target point 104 may be used, where the predicted location is based on the last known location of the moving target point 104 and a last known rate and direction of movement of the moving target point 104.

As the guidance system 250 tracks movement of the virtual leader, the guidance system 250 also applies guidance laws to cause the aircraft 102 to follow the virtual leader. The guidance laws use good helmsman guidance behavior, actual flight dynamics of the aircraft, and environmental conditions (e.g., wind), to cause the aircraft 102 to follow the virtual leader toward the moving target point 104. As a result of this arrangement, the guidance inputs to the aircraft 102 can be much less variable and the resulting flight path of the aircraft 102 is much smoother than if the aircraft were continuously trying to fly directly toward the moving target point 104.

Although the vehicle 106 and the aircraft 102 are each shown in FIG. 2 as including an instance of the guidance system 250, in some implementations, only one or the other of the vehicle 106 and the aircraft 102 includes an instance of the guidance system 250. Alternatively, in some implementations, both the vehicle 106 and the aircraft 102 include an instance of the guidance system 250; however, only one instance of the guidance system 250 is operable at any particular time to control the aircraft 102.

In some implementations, the guidance system 250B is part of a line-replaceable unit (LRU) onboard the aircraft 102 and is operable to provide guidance input to the aircraft 102, and the guidance system 250A is omitted from the vehicle 106 or is present but does not provide guidance input to the aircraft 102 (e.g., is a backup system in case of failure of the guidance system 250B). In some such implementations, the sensor(s) 204B onboard the aircraft 102 provide the relative position data that is used by the guidance system 250B. For example, the sensor(s) 204B determine the distance and direction from the aircraft 102 to the moving target point 104 independently of any sensor(s) 204A of the vehicle 106, in which case the sensor(s) 204A may be omitted. In some implementations, the guidance system 250B uses information from the sensor(s) 204B and the sensor(s) 204A to determine the relative position data. For example, the sensor(s) 204B may be used to determine the location of the aircraft 102, and the sensor(s) 204A may be used to determine the location of the vehicle 106. In this example, one or more transceivers 206A of the vehicle 106 transmit data indicating the location of the vehicle 106 to one or more transceivers 206B of the aircraft 102, and the guidance system 250B determines the relative position data based on a comparison of the location of the aircraft 102 and the location of the vehicle 106.

In some implementations, the guidance system 250A is present onboard the vehicle 106 and is operable to provide guidance input to the aircraft 102, and the guidance system 250B is omitted from the aircraft 102 or is present but does not provide guidance input to the aircraft 102 (e.g., is a backup system in case of failure of the guidance system 250A). For example, the guidance system 250A may determine guidance input for the aircraft 102 and send guidance data, based on the guidance input, via the transceiver(s) 206A to the transceivers 206B. In some such implementations, the sensor(s) 204A onboard the vehicle 106 provide the relative position data that is used by the guidance system 250A. For example, the sensor(s) 204A determine the distance and direction from the vehicle 106 to the aircraft 102 independently of any sensor(s) 204B of the aircraft 102, in which case the sensor(s) 204B may be omitted. In some implementations, the guidance system 250A uses information from the sensor(s) 204B and the sensor(s) 204A to determine the relative position data. For example, the sensor (s) 204B may be used to determine the location of the aircraft 102, and the sensor(s) 204A may be used to determine the location of the vehicle 106. In this example, the transceiver(s) 206B of the aircraft 102 transmit data indicating the location of the aircraft 102 to the transceivers 206A of the vehicle 106, and the guidance system 250A determines the relative position data based on a comparison of the location of the aircraft 102 and the location of the vehicle 106. In this example, the transceiver(s) 206A send guidance data to the transceiver(s) 206B, and a controller (not shown) onboard the aircraft 102 commands the aircraft 102 according to the guidance data.

In the particular example illustrated in FIG. 2, the transceiver(s) 206 (e.g., the transceiver(s) 206A, the transceiver (s) 206B, or both) include devices to communicate information via wireless transmissions 252. For example, as explained above, the information exchanged via the wireless transmissions 252 may include position data, guidance data, or both. In implementations in which the guidance system 250B determines guidance input based solely on position data from the sensor(s) 204B onboard the aircraft 102, the transceiver(s) 206A, the transceiver(s) 206B, or both, may be omitted.

In other examples, the aircraft 102 includes more, fewer, or different systems 210. For example, in some implementations, the aircraft 102 does not include an environmental system 216. As another example, in some implementations, the aircraft 102 includes a pneumatic system rather than the hydraulic system 218.

The vehicle 106, the aircraft 102, or both, may also include devices that provide other guidance control functions, such as station keeping or general navigation, which are not shown or are integrated with the guidance system 250.

In a particular implementation, the guidance system 250 is configured to guard the flight envelope of the aircraft 102 by regulating and limiting airspeed and altitude, and by imposing coordinated turns. Additionally, in a particular implementation, the guidance system 250 uses low bandwidth guidance logic, which together with the guarded flight envelope facilitates use of a straightforward kinematic model of the aircraft behavior. In some implementations, the kinematic model accounts for wind due to the relatively low airspeed of the aircraft 102.

Following the virtual leader is a type of path following, which prescribes the desired path of the aircraft 102 independent of time. This is distinguished from the more general concept of 'trajectory tracking' which prescribes a vehicle's desired location (and possibly orientation and other vehicle states) as a function of time.

The good helmsman behavior applied by the guidance system 250 includes aspects related to a reference frame, path parameterization, and convergence logic. In a particular aspect, the guidance system 250 uses a Serret-Frenet frame as a reference frame for following the virtual leader, as described further below.

The kinematics of the aircraft 102 are approximated by the following equations:

$$\dot{V}_a = 0 \quad \text{Eqn 1}$$

$$\dot{V}_g = \dot{\psi} V_a \sin(\chi - \psi) \quad \text{Eqn 2}$$

$$\dot{\chi} = \dot{\psi} \frac{V_a}{V_g} \cos(\chi - \psi) \quad \text{Eqn 3}$$

$$\dot{\psi} = \omega_c \quad \text{Eqn 4}$$

where $\dot{V}_a$ is the rate of change of airspeed ($V_a$), where $\dot{V}_g$ is the rate of change of groundspeed ($V_g$), $\dot{\psi}$ is the rate of change of the heading ($\psi$) of the aircraft 102, $\dot{\vec{\chi}}$ is the rate of change of the inertial course ($\chi$) of the aircraft 102, and $\omega_c$ is the commanded (as denoted by the subscript c) rate-of-turn of the aircraft 102 (which is proportional to the air-relative lateral acceleration). Note that the airspeed of the aircraft 102 is controlled to be constant, thus the rate of change of airspeed is zero (0) as in Eqn 1 above. Further, $\dot{\psi}$ is a direct control variable ($\omega_c$) because the altitude and airspeed of the aircraft 102 are held constant and due to the high bandwidth of the commanded bank angle tracking.

In a particular implementation, the guidance system 250 uses a Serret-Frenet frame. Aspects of the Serret-Frenet frame are illustrated in a diagram 290 in FIG. 2. In the diagram 290 and in the following equations, the subscript s is used to denote variables related to the Serret-Frenet frame, the subscript i is used to denote variables related to the inertial frame of the aircraft 102, the subscript AV is used to denote variables related to the aircraft 102, and the →symbol indicates a vector quantity.

In the Serret-Frenet frame, the aircraft 102 is located with coordinates $\{x_s, y_s\}$ and is following a virtual leader with inertial velocity of the virtual leader given by $\{Vs, \chi_s\}$ as the virtual leader moves along a desired path. As noted above, the airspeed $V_a$ is assumed to be constant; however, due to prevailing wind, the inertial speed, $V_g$, will vary as the course of the aircraft 102 varies. The position of the aircraft 102 is indicated at point AV in the diagram 290, and the position of the virtual leader is indicated at point s in the diagram 290. The rate of change of the position of the aircraft 102 can be determined as:

$$\frac{d}{dt}\bigg|_s \vec{p} = \vec{V}_g - \vec{V}_s - {}_i\vec{\omega}_s \times \vec{p} \quad \text{Eqn 5}$$

where ${}_i\vec{\omega}_s$ is the angular velocity of frame s with respect to frame i and other variables are as defined above. Equation 5 can be expressed in coordinates of the Serret-Frenet frame as:

$$\begin{pmatrix} \dot{x}_s \\ \dot{y}_s \end{pmatrix}_s = V_g \begin{pmatrix} \cos(\chi - \chi_s) \\ \sin(\chi - \chi_s) \end{pmatrix}_s - \begin{pmatrix} V_s \\ 0 \end{pmatrix}_s + \dot{\chi}_s \begin{pmatrix} y_s \\ -x_s \end{pmatrix}_s \quad \text{Eqn 6}$$

Equation 6 represents one way of representation of the tracking of a virtual leader. In a particular implementation, the guidance system 250 controls longitudinal dynamics of the aircraft 102 to maintain constant altitude and airspeed. The air-relative lateral acceleration, which is related to $\omega_c$ drives $\vec{\chi}$ via the kinematics described in Equation 3, above, and $V_s$ is a design variable that can be selected as needed.

For a particular path that can be parameterized as a function of an independent parameter s, a desired pattern can be specified in terms of coordinates $\{x_p(s), y_p(s)\}$, where s here is a parameter related to the distance traveled along the desired path. For example, a circular orbit with radius R can be represented by:

$$\{x_p(s), y_p(s)\} = \{R \cos(s), R \sin(s)\} \quad \text{Eqn 7}$$

Or more generally, any parameterized pattern can be represented by:

$$\{x_p(s), y_p(s)\} = \{f(s), g(s)\} \quad \text{Eqn 8}$$

where f(s) and g(s) are functions of s.

As an example, a particle traveling along a desired path has a position given by the parameter s, and the direction of the path at s is:

$$\chi_s = \arctan_s\left(\frac{dy_p}{ds}, \frac{dx_p}{ds}\right) \quad \text{Eqn 9}$$

where $\arctan_2$ refers to the 4-quadrant version of the arctangent function. Further, the Serret-Frenet reference frame is defined to have its x-axis oriented along a positive direction of the path at s, its z-axis down, and its y-axis in a right-hand orientation. As such:

$$\vec{V}_s = \begin{pmatrix} V_s \\ 0 \end{pmatrix}_s \quad \text{Eqn 10}$$

where $V_s$ is a design variable. Further, progress along the path is given by:

$$\dot{s} = \frac{V_s}{\sqrt{\left(\frac{dx_p}{ds}\right)^2 + \left(\frac{dy_p}{ds}\right)^2}} \quad \text{Eqn 11}$$

And the position of the Serret-Frenet reference frame along the desired path is indicated by the parameter s by:

$$s_{k+1} s_k + \dot{s}_k \Delta_t \quad \text{Eqn 12}$$

where k is a time index and so is a starting point of the pattern.

General path following logic can be described as:

$$\chi_c = \chi_s + \chi_H \quad \text{Eqn 13}$$

Where $\chi_c$ is a course command of the aircraft 102, $\chi_s$ is the location direction of the desired path, and $\chi_H$ represents some desired convergence behavior. A closed loop representation when the course command of the aircraft 102 is implemented using a feedback linearizing controller is:

$$\dot{\chi} = \dot{\chi}_c + K_\chi(\chi_c - \chi) \quad \text{Eqn 14}$$

where $K_\chi$ is an along track error gain. The local direction of the desired path, $\chi_s$, can be defined by perpendicular projection, a projection look-ahead distance, other factors, or a combination thereof.

The convergence behavior represented by $\chi_H$ in Equation 13 is specified to guide the aircraft onto the desired path while simultaneously aligning the aircraft 102 with the desired path. This behavior is referred to herein as "good helmsman" behavior. The convergence behavior can be specified via proportional navigation logic, a vector potential field, etc. In a particular aspect, $\chi_H$ may be constrained (e.g., by heuristics) to some intercept angle less than, or equal to, 90 degrees. In some implementations, the constraint on $\chi_H$ may be based on or related to expectations regarding the operating environment of the aircraft 102 in order to guarantee path convergence. For example, the intercept angle may be selected to be large enough to allow a cross track velocity that can overcome the effect of cross wind or current.

Further, in some implementations, the aircraft 102 has a limited (i.e., constrained) ability to generate lateral acceleration, which constrains the direct control variable ($\omega_c$) and $\dot{\chi}_c$. The constraint on $\dot{\chi}_c$ is typically an aerodynamic limitation based on the limited range of $\omega_c$, which kinematically constrains the course rate of change. As a result of this constraint, Equation 3 can be restated with Equation 4 incorporated as:

$$|\dot{\chi}_c| \leq \omega_{max} \frac{V_a}{V_g} \cos(\chi - \psi) \quad \text{Eqn 15}$$

where $\omega_{max} \geq |\omega_c|$

In a particular implementation, $\chi_H$ is specified by a function such as:

$$\chi_H = -\chi_{icpt} \sigma(y_s) \quad \text{Eqn 16}$$

where $\chi_{icpt}$ is a desired intercept angle between 0 degrees and 90 degrees, and $\sigma(\ )$ refers to a strictly increasing odd sigmoidal function (also referred to as a "squashing function). As one example, $\sigma(\cdot) = \tanh(\cdot)$. As another example, $\sigma(\cdot) = 2/\pi \arctan(\cdot)$. In a particular implementation, $\sigma(\cdot)$ is represented as:

$$\sigma(y_S) = \frac{e^{-my_s} - 1}{e^{-my_s} + 1} \quad \text{Eqn 17}$$

$$m = \frac{2K_y}{V_g \chi_{icpt}} \quad \text{Eqn 18}$$

where m is a bounded sigmoidal gain function, $K_y$ is a cross track error gain, and other variables are as defined above.

FIGS. 3A-3C illustrate additional aspects of the approach of the aircraft 102 of FIGS. 1A and 1B toward the moving target point 104 over a period of time. In particular, FIG. 3A illustrates aspects of the approach of the aircraft 102 of FIGS. 1A and 1B to the moving target point 104 at a first time, FIG. 3B illustrates aspects of the approach at a second time subsequent to the first time of FIG. 3A, and FIG. 3C illustrates aspects of the approach at a third time subsequent to the second time of FIG. 3B. In each of FIGS. 3A-3C, a current location (at the particular time illustrated in the respective figure) of the aircraft 102 is illustrated and indicated by reference number 152, a current location of the virtual leader is illustrated and indicated by reference number 162, a current location of the moving target point 104 is illustrated and indicated by reference number 156, and a current virtual leader path is illustrated and indicated by reference number 160. Thus, as one progresses from FIG. 3A to FIG. 3B and subsequently to FIG. 3C, the illustrated conditions change.

Referring to FIG. 3A, a first state of a system 300 is illustrated at the first time. Note that as used herein, the first time may be an initial time (e.g., a time corresponding to initialization of the guidance system 250 as the aircraft 102 begins a particular approach to the moving target point 104) or some other arbitrary time during the approach of the aircraft 102 that is followed by the second time and the third time. After initialization, the virtual leader path 160 is determined during each update by extending a straight line directly from the location 156 of the moving target point 104 to the location 162 of the virtual leader. However, during initialization, the location 162 of the virtual leader has not yet been established. Accordingly, during initialization, the location 162 of the virtual leader is a selected point along an initial virtual leader path, which is determined based on a desired approach direction of the aircraft 102 to the moving target point 104. The desired approach direction, during initialization, is a direction from which the aircraft 102 is intended to approach the moving target point 104. For example, the desired approach direction may be indicated as an angle relative to the moving target point 104 or relative to a vehicle to which the moving target point 104 is coupled. As another example, the desired approach direction may be indicated as an angle relative to a cardinal direction (e.g., true North) or relative to a navigational direction (e.g., magnetic North). In still other examples, the desired approach direction may be specified as a direction in some other reference frame that is recognized by the guidance system 250.

At the first time associated with FIG. 3A, the location 162 of the virtual leader is on the virtual leader path 160. In a particular implementation, the location 162 of the virtual leader is offset (by offset distance 314) from a projection of the location 152 of the aircraft onto the virtual leader path 160, and the location 152 of the aircraft 102 is offset (by cross track error distance 312) from the virtual leader path 160. Movement of the virtual leader is tracked (e.g., computed) based on a course and speed of the virtual leader (as indicated by the direction and length of vector 316) along the virtual leader path 160 as illustrated in FIG. 3A by a projected future position 320 at a time subsequent to the first time (e.g., the second time). Movement of the aircraft 102 is also tracked (e.g., computed and/or sensed) based on a course and speed of the aircraft 102 (as indicated by the direction and length of vector 310) and other factors (e.g., wind).

In FIG. 3A, the course and speed of the aircraft 102 and the course and speed of the virtual leader are illustrated at one particular time ($T_1$); however, the course and speed of the aircraft 102, the course and speed of the virtual leader, or both, may change periodically, occasionally, or continuously. For example, FIG. 3A illustrates an approximate future path 318 of the aircraft 102 as the aircraft 102 follows the virtual leader and comes into alignment with the virtual leader path 160. Note that by definition, movement of the virtual leader is always along the virtual leader path 160; however, as illustrated in FIGS. 3B and 3C, the direction of the virtual leader path 160 changes based on movement of the moving target point 104.

Referring to FIG. 3B, a second state of the system 300 is illustrated at the second time ($T_2$). The second time is subsequent to the first time of FIG. 3A. The amount of time between the first time and the second time is arbitrary and is generally a relatively small fraction of the total time of the approach of the aircraft 102 to the moving target point 104. For example, the total time of the approach of the aircraft 102 to the moving target point 104 may typically be in the order of tens of seconds to several minutes; whereas the amount of time between the first and second time is typically in the range of a fraction of a second up to about one second.

In addition to showing the state of the system 300 at the second time, FIG. 3B illustrates prior state information to visualize changes that occurred between the first time illustrated in FIG. 3A and the second time illustrated in FIG. 3B. For example, FIG. 3B shows a prior location 330 of the moving target point 104, which corresponds to the location 156 of the moving target point 104 at the first time as shown in FIG. 3A.

Similarly, FIG. 3B shows a prior virtual leader path 332, which corresponds to the virtual leader path 160 at the first time as shown in FIG. 3A. Thus, at the second time illustrated in FIG. 3B, the location 156 of the moving target point 104 has shifted (e.g., the moving target point 104 has moved) from the prior location 330, and the virtual leader path 160 has changed from the prior virtual leader path 332.

FIG. 3B also illustrates a path 154 of the aircraft 102 over time. The path 154 of the aircraft 102 illustrates movement of the aircraft 102 between the first time of FIG. 3A and the second time of FIG. 3B as the aircraft 102 followed the virtual leader.

At the second time of FIG. 3B, the location 162 of the virtual leader is at the intersection of the prior virtual leader path 332 and the virtual leader path 160. Between the first time and the second time, the guidance system 250 tracks the location 162 of the virtual leader along the virtual leader path 160 of FIG. 3A. For example, the location 162 at the second time is offset along the virtual leader path 160 of FIG. 3A from the location 162 at the first time by a distance based on a speed of the virtual leader and a duration between the first time and the second time. When an updated location 156 of the moving target point 104 is determined or received, the guidance system 250 updates the virtual leader path 160 to a direct path from the tracked location 162 of the virtual leader to the updated location 156 of the moving target point 104. The guidance system 250 also determines the course and speed of the virtual leader (as indicated by the direction and length of vector 316 of FIG. 3B) to be along the updated virtual leader path 160 as illustrated in FIG. 3B. Thus, in FIG. 3B, a projected future position 320 of the virtual leader is along the updated virtual leader path 160 rather than along the prior virtual leader path 332.

Referring to FIG. 3C, a third state of the system 300 is illustrated at the third time ($T_3$). The third time is subsequent to the second time of FIG. 3B. The amount of time between the second time and the third time may be the same as the amount of time between the first time and the second time, or the amount of time between the second time and the third time may be different from the amount of time between the first time and the second time. For example, the second time may correspond to a time when the guidance system 250 received or determined update data indicating the location 156 of the moving target point 104 illustrated in FIG. 3B, and the third time may correspond to when the guidance system 250 received or determined update data indicating the location 156 of the moving target point 104 illustrated in FIG. 3C. In this example, the amount of time between the first and second times is a first update interval, and the amount of time between the second and third times is a second update interval. In some implementations, the location 156 of the moving target point 104 is updated periodically (e.g., at regular intervals). In such implementations, the first update interval is equal to the second update interval. In other implementations, the interval between updates of the location 156 of the moving target point 104 is variable. For example, in some such implementations, the location 156 of the moving target point 104 is updated more frequently when the moving target point 104 is moving rapidly and is updated less frequently when the moving target point 104 is moving slowly. As another example, in some such implementations, the location 156 of the moving target point 104 is updated more frequently as the aircraft 102 gets closer to the moving target point 104.

In addition to showing the state of the system 300 at the third time, FIG. 3C illustrates prior state information to visualize changes that occurred between the second time illustrated in FIG. 3B and the third time illustrated in FIG. 3C. For example, FIG. 3C shows the prior location 330 of the moving target point 104, which corresponds to the location 156 of the moving target point 104 at the second time as shown in FIG. 3B. Similarly, FIG. 3C shows the prior virtual leader path 332, which corresponds to the virtual leader path 160 at the second time as shown in FIG. 3B. Thus, at the third time illustrated in FIG. 3C, the location 156 of the moving target point 104 has shifted (e.g., the moving target point 104 has moved) from the prior location 330, and the virtual leader path 160 has changed from the prior virtual leader path 332.

FIG. 3C also illustrates the path 154 of the aircraft 102 over time. The path 154 of the aircraft 102 illustrates movement of the aircraft 102 between the first time of FIG. 3A and the third time of FIG. 3C as the aircraft 102 followed the virtual leader.

At the third time of FIG. 3C, the location 162 of the virtual leader is at the intersection of the prior virtual leader path 332 and the virtual leader path 160. Additionally, FIG. 3C illustrates the projected future position 320 of the virtual leader along the updated virtual leader path 160 based on the course and speed of the virtual leader (as indicated by the direction and length of vector 316 of FIG. 3C).

FIGS. 4 and 5 are diagrams that illustrate flight paths and guidance inputs of an aircraft 102 approaching a moving target point 104. In each of FIGS. 4 and 5, the moving target point 104 moves according to a pattern 402, and the guidance inputs illustrated in both FIGS. 4 and 5 are based on the same guidance control laws.

FIG. 4 illustrates guidance input 406 when a guidance system continuously attempts to fly the aircraft 102 directly from a current location of the aircraft 102 to a current location of the moving target point 104. For ease of reference, attempting to fly the aircraft 102 directly from the current location of the aircraft to the current location of the moving target point 104 is referred to herein as a "direct approach". FIG. 4 also illustrates a flight path 404 that results from the guidance input 406 and flight dynamics of the aircraft 102. In contrast, FIG. 5 illustrates guidance input 506 when the guidance system 250 attempts to follow the virtual leader as described with reference to FIGS. 1C and 3A-3C. For ease of reference, attempting to follow a virtual leader as the virtual leader moves toward a moving target point 104 is referred to herein as a "virtual leader approach". FIG. 5 also illustrates a flight path 504 that results from the guidance input 506 and flight dynamics of the aircraft 102.

The oscillations exhibited by the flight path 404 and the guidance input 406 of FIG. 4 are due to flight dynamics of the aircraft 102. In particular, in FIG. 4, the moving target point 104 is moving according to the pattern 402, which includes side-to-side motion. The aircraft 102 in FIG. 4 is attempting, at all times, to fly a direct approach path to the moving target point 104. However, the aircraft 102 is not able to directly manipulate its sideward motion to follow the side-to-side motion of the moving target point 104. Rather, when the moving target point 104 moves to one side, the flight dynamics of the aircraft 102 require the aircraft 102 to continue flying forward while banking (as indicted by the guidance input 406) to turn toward the desired approach direction, resulting over time in the oscillations illustrated in FIG. 4. Although the guidance input 406 and resulting flight path 404 shown in FIG. 4 are based on a fixed-wing aircraft, similar dynamics are common to a number of other types of vehicles, such as automobiles and rotorcraft with inarticulate rotors (e.g., common quadcopters).

In FIG. 5, rather than attempting to fly directly toward the moving target point 104, the aircraft 102 is following the virtual leader (e.g., performing a virtual leader approach). Motion of the virtual leader is not limited by flight dynamics since the virtual leader is not a physical object. As such, the virtual leader can instantaneously change direction, speed, etc. For example, as shown in FIGS. 3A-3C, the virtual leader is always on a path (the virtual leader path 160 of FIGS. 3A-3C) directly toward the moving target point 104. By following behind the virtual leader toward the moving target point 104, the guidance input 506 provided to the aircraft 102 and the resulting flight path 504 are significantly smoothed relative to the guidance input 406 and the flight path 404 in the situation illustrated in FIG. 4.

Figure 6:
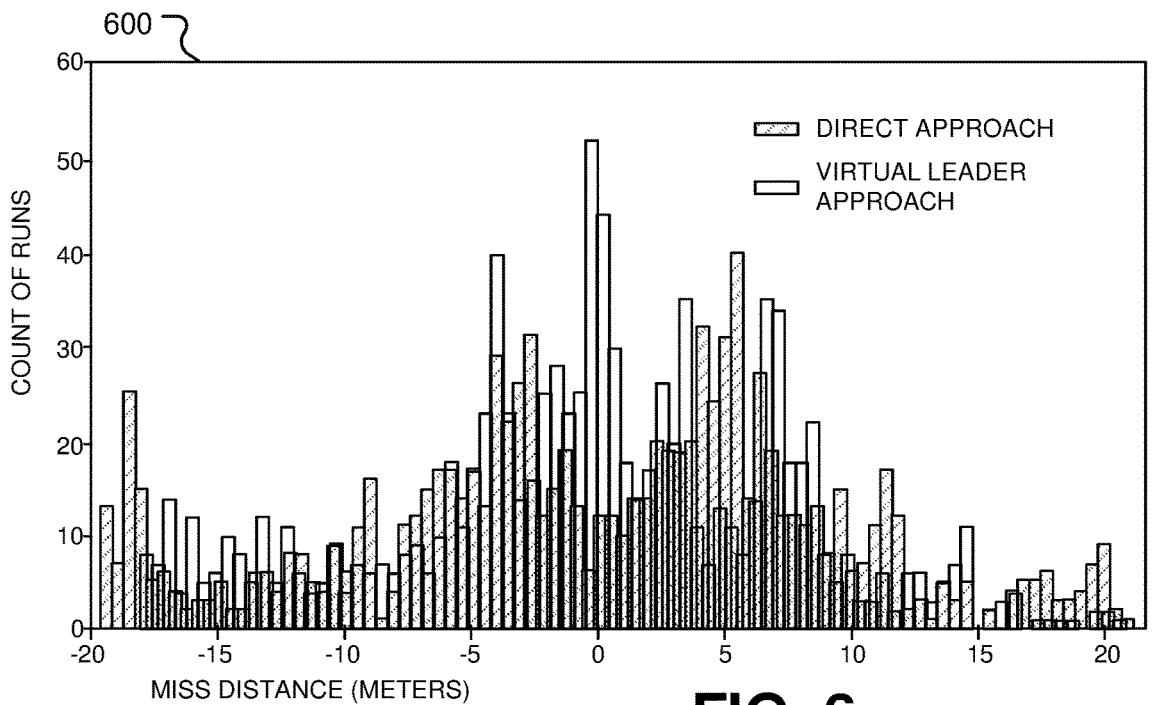
FIG. 6 is a histogram of results of Monte Carlo simulation of approaches of an aircraft to a moving target point.

FIG. 6 is a histogram 600 of results of a Monte Carlo simulation of approaches of an aircraft to a moving target point (e.g., the aircraft 102 of FIGS. 1A and 1B approaching the moving target point 104). The histogram 600 includes data based on two distinct types of approaches. In particular, boxes of the histogram 600 filled with diagonal lines represent direct approaches, and unfilled boxes of the histogram 600 represent virtual leader approaches. For purposes of the Monte Carlo simulation, motion of the moving target point was randomized for various approaches, and the flight dynamics of the aircraft were identical for the direct approaches and the virtual leader approaches.

In the histogram 600, the horizontal axis represents miss distance in meters, where miss distance refers to closest approach (e.g., a minimum distance) between the aircraft and the moving target point that was achieved during a particular simulation run. The vertical axis of the histogram 600 represents a count of simulation runs that resulted in a particular miss distance. The histogram 600 shows that during the Monte Carlo simulation, the virtual leader approach decreases the average miss distance. Put another way, the aircraft was successfully captured by the moving target point more consistently using the virtual leader approach than using the direct approach.

Figure 7:
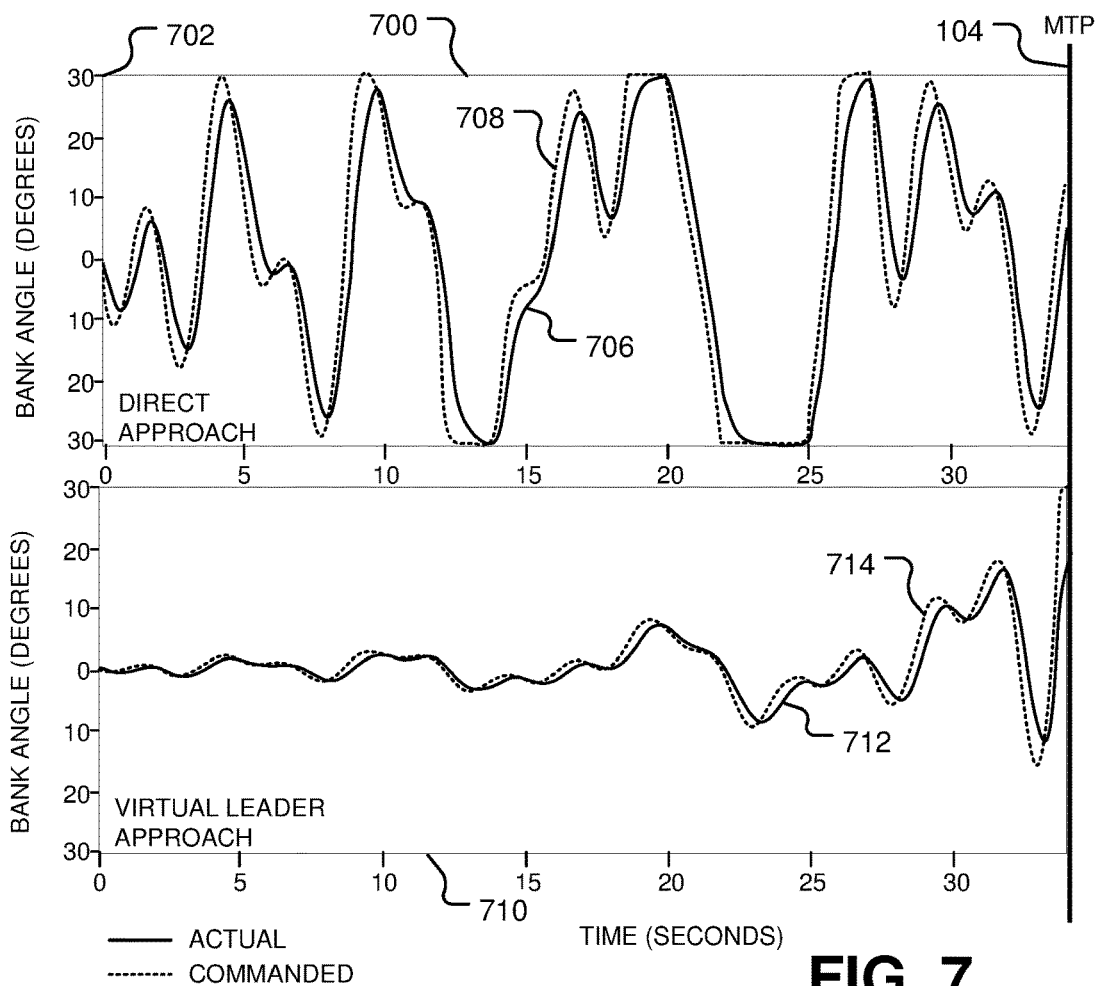
FIG. 7 shows two diagrams contrasting control effort for direct and virtual leader approaches.

FIG. 7 shows two diagrams contrasting control effort for direct and virtual leader approaches. In FIG. 7, a diagram 700 represents a direct approach, and a diagram 710 represents a virtual leader approach. For each of diagrams 700 and 710, an aircraft (e.g., the aircraft 102 of FIGS. 1A and 1B) begins an approach at 0 seconds (i.e., an initial time of the approach at 702), and each diagram 700 and 710 ends at the moving target point (MTP) 104. The vertical axis of each diagram 700 and 710 represents bank angle of the aircraft in degrees along each approach. The aircraft for the direct approach represented in the diagram 700 has the same flight dynamics as the aircraft for the virtual leader approach represented in the diagram 710.

A first line 706 of the diagram 700 represents an actual bank angle during the direct approach, and a second line 708 represents a commanded bank angle of the aircraft during the direct approach. To illustrate, the commanded bank angle corresponds to the guidance input 406 of FIG. 4. Likewise, a first line 712 of the diagram 710 represents an actual bank angle during the virtual leader approach, and a second line 714 represents a commanded bank angle of the aircraft during the virtual leader approach. To illustrate, the commanded bank angle corresponds to the guidance input 506 of FIG. 5.

A comparison of the first line 706 of the diagram 700 and the first line 712 of the diagram 710 shows that the aircraft is subjected to significantly smaller bank angles during the virtual leader approach than during the direct approach. Put another way, the aircraft applies significantly less control effort for the virtual leader approach than for the direct approach. This distinction is especially clear for early stages of the approach (e.g., in the 0 seconds to 30 seconds time period illustrated).

The actual bank angles (represented by lines 706 and 712) account for realistic roll dynamics of the aircraft 102 in response to the commanded bank angles (represented by lines 708 and 714). Due to the roll dynamics of the aircraft 102, the actual bank angle lines (lines 706, 712) lag behind the respective commanded bank angle lines (lines 708, 714). This lag is exacerbated during high frequency maneuvering. Since the direct approach illustrated in diagram 700 requires significantly more frequent and more severe changes in direction than the virtual leader approach illustrated in diagram 710, the direct approach has greater separation between the commanded and actual bank angles throughout much of the approach.

Figure 8:
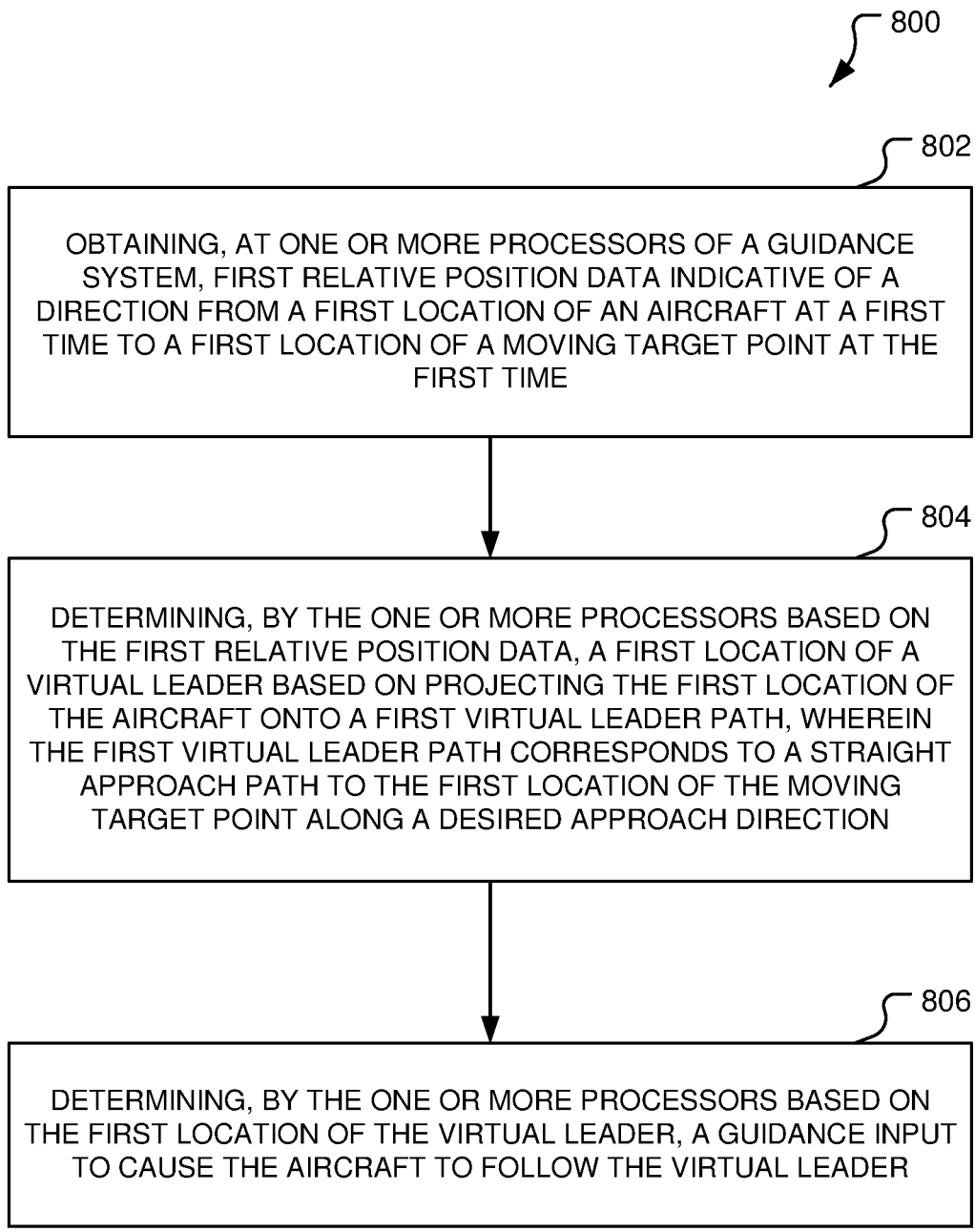
FIG. 8 is a diagram that illustrates a flow chart of an example of a method of guiding an aircraft to a moving target point according to a particular aspect.

FIG. 8 is a diagram that illustrates a flow chart of an example of method 800 of guiding an aircraft (e.g., the aircraft 102 of FIGS. 1A, 1B, and 2) to a moving target point (e.g., the moving target point 104 of FIGS. 1A, 1B, and 2) according to a particular aspect. For example, the method 800 may be performed by one or more processors of the guidance system 250B or by one or more processors of the guidance system 250A.

The method 800 includes, at block 802, obtaining, at the processor(s) of the guidance system, first relative position data indicative of a direction from a first location of an aircraft at a first time to a first location of a moving target point at the first time. For example, the relative position data may be based on information from the sensor(s) 204A, information from the sensor(s) 204B, or both. In a particular aspect, the moving target point (e.g., the moving target point 104) is coupled to a vehicle (e.g. the vehicle 106) that is in motion (e.g., due to a propulsion system of the vehicle, due to environmental conditions, or both). To illustrate, the vehicle may be translating along a first axis while also rotating about the first axis (such as may be the case for a watercraft moving forward and encountering waves from the side). In other examples, the vehicle may be translating along more than one axis, such as moving forward under its own power and being moved in another direction by waves, turbulence, currents, or, in the case of a land vehicle, surface irregularities. Additionally, or alternatively, the vehicle may be rotating about more than one axis, such as movement caused by waves, turbulence, currents, or, in the case of a land vehicle, surface irregularities.

The method 800 includes, at block 804, determining, by the processor(s) based on the first relative position data, a first location of a virtual leader based on projecting the first location of the aircraft onto a first virtual leader path, where the first virtual leader path corresponds to a straight approach path to the first location of the moving target point along a desired approach direction. For example, as described with reference to FIGS. 3A-3C, the guidance system 250 determines the location of the virtual leader based on the relative position data at a particular time and a desired approach direction. In a particular aspect, an initial virtual leader relative direction is based on approach criteria associated with an approach of the aircraft 102 to the moving target point 104. For example, during initialization of an approach, the initial virtual leader relative direction may be set to correspond to the desired approach direction, which may be specified as an approach criterion for the vehicle 106 or the aircraft 102.

The method 800 includes, at block 806, determining, by the processor(s) based on the first location of the virtual leader, a guidance input to cause the aircraft to follow the virtual leader. For example, the guidance system 250 may determine the guidance input based on good helmsman guidance behavior, flight dynamics of the aircraft 102, environmental conditions (e.g., wind), and possibly other factors. As one example, the guidance input specifies a bank angle of the aircraft to cause the aircraft to follow the virtual leader.

Figure 9:
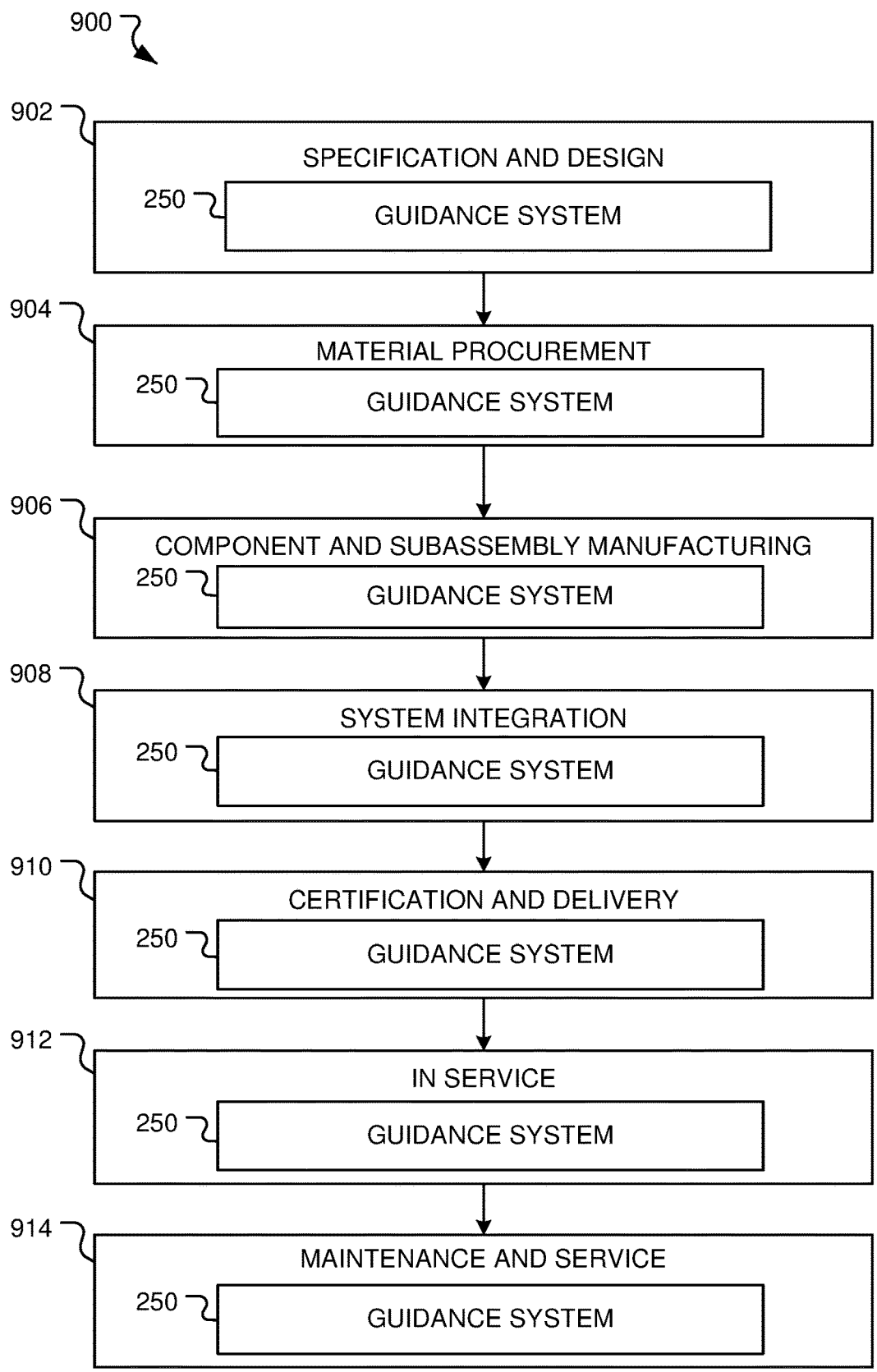
FIG. 9 is a flowchart illustrating a life cycle of an aircraft according to a particular aspect.

FIG. 9 is a flowchart illustrating a method 900 representing aspects of a life cycle of an aircraft that includes a guidance system 250 configured to smooth an approach of the aircraft to a moving target point. For example, the aircraft may include or correspond to the aircraft 102 of FIG. 2, and the guidance system 250 may include or correspond to one or more line replaceable units (LRUs) of the aircraft.

Referring to FIG. 9, during pre-production, the method 900 includes, at 902, specification and design of an aircraft, such as the aircraft 102 described with reference to FIG. 2. During specification and design of the aircraft, the method 900 may include specification and design of the guidance system 250. At 904, the method 900 includes material procurement, which may include procuring materials for the guidance system 250.

During production, the method 900 includes, at 906, component and subassembly manufacturing and, at 908, system integration of the aircraft. For example, the method 900 may include component and subassembly manufacturing of the guidance system 250 and system integration of the guidance system 250. At 910, the method 900 includes certification and delivery of the aircraft and, at 912, placing the aircraft in service. Certification and delivery may include certification of the guidance system 250 to place the guidance system 250 in service. While in service by a customer, the aircraft may be scheduled for routine maintenance and service (which may also include modification, reconfiguration, refurbishment, and so on). At 914, the method 900 includes performing maintenance and service on the aircraft, which may include performing maintenance and service on the guidance system 250.

Each of the processes of the method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 10:
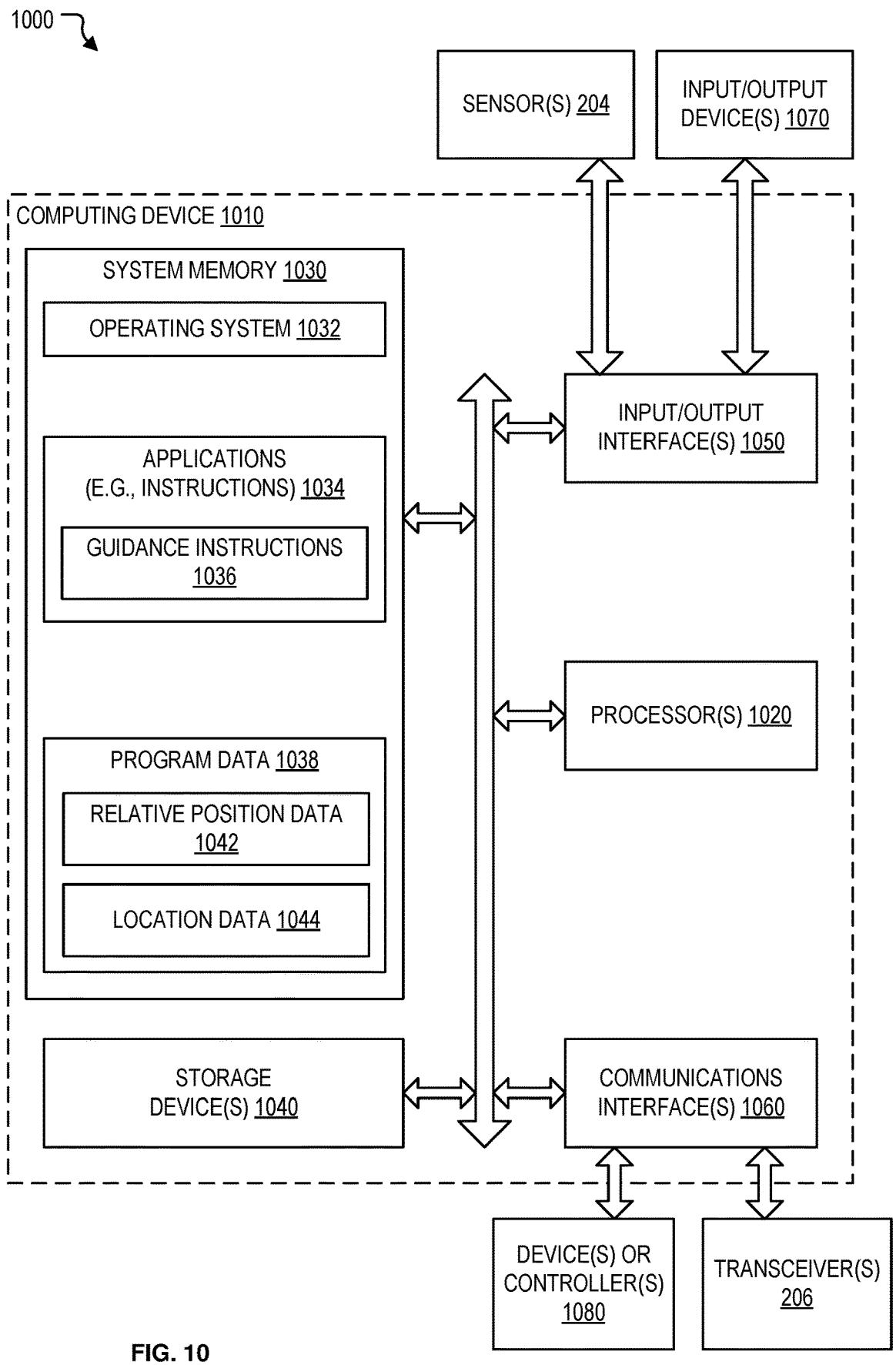
FIG. 10 is a block diagram of a computing environment including a computing device configured to support aspects of computer-implemented methods and computer-executable program instructions (or code) according to a particular aspect.

FIG. 10 is a block diagram of a computing environment 1000 including a computing device 1010 configured to support aspects of computer-implemented methods and computer-executable program instructions (or code) according to the present disclosure. For example, the computing device 1010, or portions thereof, is configured to execute instructions to initiate, perform, or control one or more operations described with reference to FIGS. 1A-9. To illustrate, the computing device 1010 may include, be included within, or correspond to the guidance system 250.

The computing device 1010 includes one or more processors 1020. The processor(s) 1020 are configured to communicate with system memory 1030, one or more storage devices 1040, one or more input/output interfaces 1050, one or more communications interfaces 1060, or any combination thereof. The system memory 1030 includes volatile memory devices (e.g., random access memory (RAM) devices), nonvolatile memory devices (e.g., read-only memory (ROM) devices, programmable read-only memory, and flash memory), or both. The system memory 1030 stores an operating system 1032, which may include a basic input/output system for booting the computing device 1010 as well as a full operating system to enable the computing device 1010 to interact with users, other programs, and other devices.

The system memory 1030 stores system (program) data 1038, such as relative position data 1042, location data 1044, or both. In a particular aspect, the relative position data 1042 indicates, for example, a distance and direction between an aircraft (e.g., the aircraft 102 of FIG. 2) and a moving target point (e.g., the moving target point 104 of FIG. 2). In a particular aspect, the location data 1044 indicates, for example, a location of an aircraft (e.g., the aircraft 102 of FIG. 2), a location of a moving target point (e.g., the moving target point 104 of FIG. 2), or both.

The system memory 1030 includes one or more applications 1034 (e.g., sets of instructions) executable by the processor(s) 1020. As an example, the one or more applications 1034 include instructions executable by the processor(s) 1020 to initiate, control, or perform one or more operations described with reference to FIGS. 1A-9. To illustrate, the one or more applications 1034 include guidance instructions 1036 executable by the processor(s) 1020 to initiate, control, or perform one or more operations described with reference to the guidance system 250.

In a particular implementation, the system memory 1030 includes a non-transitory, computer readable medium storing the instructions that, when executed by the processor(s) 1020, cause the processor(s) 1020 to initiate, perform, or control operations to smooth an approach of an aircraft to a moving target point. For example, the operations may include obtaining relative position data indicative of a direction from a location of the aircraft to a location of the moving target point; determining, based on the relative position data, a location of a virtual leader; and determining, based on the first location of the virtual leader, a guidance input to cause the aircraft to follow the virtual leader.

The one or more storage devices 1040 include nonvolatile storage devices, such as magnetic disks, optical disks, or flash memory devices. In a particular example, the storage devices 1040 include both removable and non-removable memory devices. The storage devices 1040 are configured to store an operating system, images of operating systems, applications (e.g., one or more of the applications 1034), and program data (e.g., the program data 1036). In a particular aspect, the system memory 1030, the storage devices 1040, or both, include tangible computer-readable media. In a particular aspect, one or more of the storage devices 1040 are external to the computing device 1010.

The one or more input/output interfaces 1050 enable the computing device 1010 to communicate with one or more input/output devices 1070 to facilitate user interaction. For example, the input/output interface(s) 1050 may be coupled to the sensor(s) 204, which are configured to determine position information. In the same or a different example, the one or more input/output interfaces 1050 can include a display interface, an input interface, or both. For example, the input/output interface 1050 may be adapted to receive input from a user, to receive input from another computing device, or a combination thereof. In some implementations, the input/output interface 1050 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1070 includes one or more user interface devices and displays, including some combination of buttons, keyboards, pointing devices, displays, speakers, microphones, touch screens, and other devices.

The processor(s) 1020 are configured to communicate with devices or controllers 1080 via the one or more communications interfaces 1060. For example, the one or more communications interfaces 1060 can include a network interface. The device(s) or controller(s) may include, for example, a flight control computer of an aircraft or an actuator controller of the aircraft. In some implementations, the communications interface(s) 1060 are coupled to the transceiver(s) 206 to enable the computing device 1010 to send or receive information via wireless transmissions.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1A-9. In some implementations, part or all of one or more of the operations or methods of FIGS. 1A-9 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Aspects of the disclosure are captured in the following interrelated examples:

According to Example 1, a method of guidance for an aircraft includes: obtaining, at one or more processors of a guidance system, first relative position data indicative of a direction from a first location of the aircraft at a first time to a first location of a moving target point at the first time; determining, by the one or more processors based on the first relative position data, a first location of a virtual leader based on projecting the first location of the aircraft onto a first virtual leader path, wherein the first virtual leader path corresponds to a straight approach path to the first location of the moving target point along a desired approach direction; and determining, by the one or more processors based on the first location of the virtual leader, a guidance input to cause the aircraft to follow the virtual leader.

Example 2 includes the method of Example 1, further including: obtaining, at the one or more processors of the guidance system, second relative position data indicative of a second direction from a second location of the aircraft at a second time to a second location of the moving target point at the second time, wherein the second time is subsequent to the first time; determining, by the one or more processors, a second location of the virtual leader, the second location of the virtual leader corresponding to a location along the first virtual leader path offset from the first location of the virtual leader by a distance based on a speed of the virtual leader and a duration between the first time and the second time; determining, by the one or more processors based on the second relative position data, a second virtual leader path corresponding to a straight path between the second location of the moving target point and the second location of the virtual leader; and determining, by the one or more processors based on the second location of the virtual leader, a second guidance input to cause the aircraft to follow the virtual leader.

Example 3 includes the method of Example 1 or the method of Example 2, further including determining an initial virtual leader relative direction based on approach criteria associated with an approach of the aircraft to the moving target point.

Example 4 includes the method of any of Examples 1 to 3, wherein the first relative position data is based on data from one or more sensors onboard the aircraft.

Example 5 includes the method of Example 4, wherein the moving target point is onboard a vehicle, and wherein the first relative position data is further based on data from one or more sensors onboard the vehicle.

Example 6 includes the method of Example 4 or the method of Example 5, wherein the one or more sensors onboard the aircraft include one or more of a global position system (GPS) receiver, one or more passive electromagnetic sensors, one or more active electromagnetic sensors, or one or more inertial measurement sensors.

Example 7 includes the method of any of Examples 1 to 6, wherein the moving target point is onboard a vehicle, and wherein the first relative position data is received via transmission from the vehicle and is based on data from one or more sensors onboard the vehicle.

Example 8 includes the method of Example 7, wherein the one or more sensors onboard the vehicle include one or more of a global position system (GPS) receiver, one or more passive electromagnetic sensors, one or more active electromagnetic sensors, or one or more inertial measurement sensors.

Example 9 includes the method of any of Examples 1 to 8, wherein the moving target point corresponds to an aircraft recovery device that is coupled to a vehicle that is in motion.

Example 10 includes the method of Example 9, wherein the vehicle corresponds to a watercraft, a second aircraft, or a land craft.

Example 11 includes the method of Example 9 or the method of Example 10, wherein the motion of the vehicle is due at least in part to a propulsion system of the vehicle.

Example 12 includes the method of any of Examples 9 to 11, wherein the motion of the vehicle is due at least in part to external forces applied to the vehicle by its environment.

Example 13 includes the method of any of Examples 9 to 12, wherein the motion of the vehicle includes periodic or occasional rotation about a first axis of the vehicle, and wherein the direction from the first location of the aircraft to the first location of the moving target point is substantially aligned with the first axis.

Example 14 includes the method of any of Examples 9 to 13, wherein the motion of the vehicle includes rotation about a first axis of the vehicle and translation along the first axis.

Example 15 includes the method of any of Examples 9 to 14, wherein the motion of the vehicle is due to movement of the vehicle with respect to an irregular surface.

Example 16 includes the method of any of Examples 1 to 15, wherein the aircraft corresponds to a fixed wing aircraft.

Example 17 includes the method of any of Examples 1 to 16, wherein the guidance input includes a bank angle.

According to Example 18, a system includes: an aircraft; an aircraft recovery device configured to be coupled to a vehicle and configured to recover the aircraft while the vehicle is in motion; and a guidance system including one or more processors, the guidance system configured to: obtain first relative position data indicative of a direction from a first location of the aircraft at a first time to a first location of a moving target point of the aircraft recovery device at the first time; determine, based on the first relative position data, a first location of a virtual leader based on projection of first aircraft location information onto a first virtual leader path, wherein the first virtual leader path corresponds to a straight approach path to the first location of the moving target point along a desired approach direction; and determine, based on the first location of the virtual leader, a guidance input to cause the aircraft to follow the virtual leader.

Example 19 includes the system of Example 18, wherein the guidance system is disposed onboard the aircraft.

Example 20 includes the system of Example 18, wherein the guidance system is disposed onboard the vehicle.

According to Example 21, an aircraft includes: a guidance system including one or more processors, the guidance system configured to: obtain first relative position data indicative of a direction from a first location of the aircraft at a first time to a first location of a moving target point at the first time; determine, based on the first relative position data, a first location of a virtual leader based on projection of first aircraft location information onto a first virtual leader path, wherein the first virtual leader path corresponds to a straight approach path to the first location of the moving target point along a desired approach direction; and determine, based on the first location of the virtual leader, a guidance input to cause the aircraft to follow the virtual leader.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of guidance for an aircraft, the method comprising:
   obtaining, at one or more processors of a guidance system, first relative position data indicative of a direction from a first location of the aircraft at a first time to a first location of a moving target point at the first time;
   determining, by the one or more processors based on the first relative position data, a first location of a virtual leader based on projecting the first location of the aircraft onto a first virtual leader path, wherein the first virtual leader path corresponds to a straight approach path to the first location of the moving target point along a desired approach direction, the virtual leader distinct from the moving target point;
   determining, by the one or more processors based on the first location of the virtual leader, a guidance input to cause the aircraft to follow the virtual leader;
   causing, by the one or more processors, the aircraft to follow the virtual leader by providing the guidance input to the aircraft;
   determining, by the one or more processors, a second location of the virtual leader based on the first location, the first virtual leader path, and a virtual velocity associated with the virtual leader; and determining, by the one or more processors based on the second location of the virtual leader, a second guidance input to cause the aircraft to follow the virtual leader;

obtaining, by the one or more processors, second relative position data indicative of a second direction from a second location of the aircraft at a second time to a second location of the moving target point at the second time;

determining, by the one or more processors based on the second relative position data, a third location of the virtual leader based on projecting the second location of the aircraft onto a second virtual leader path; and determining, by the one or more processors based on the third location of the virtual leader, a third guidance input to cause the aircraft to follow the virtual leader.

2. The method of claim 1, further comprising determining an initial virtual leader relative direction based on approach criteria associated with an approach of the aircraft to the moving target point.

3. The method of claim 1, wherein the first relative position data is based on data from one or more sensors onboard the aircraft.

4. The method of claim 3, wherein the moving target point is onboard a vehicle, and wherein the first relative position data is further based on data from one or more sensors onboard the vehicle.

5. The method of claim 3, wherein the one or more sensors onboard the aircraft include one or more of a global position system (GPS) receiver, one or more passive electromagnetic sensors, one or more active electromagnetic sensors, or one or more inertial measurement sensors.

6. The method of claim 1, wherein the moving target point is onboard a vehicle, and wherein the first relative position data is received via transmission from the vehicle and is based on data from one or more sensors onboard the vehicle.

7. The method of claim 6, wherein the one or more sensors onboard the vehicle include one or more of a global position system (GPS) receiver, one or more passive electromagnetic sensors, one or more active electromagnetic sensors, or one or more inertial measurement sensors.

8. The method of claim 1, wherein the moving target point corresponds to an aircraft recovery device that is coupled to a vehicle that is in motion.

9. The method of claim 8, wherein the vehicle corresponds to a watercraft, a second aircraft, or a land craft.

10. The method of claim 8, wherein the motion of the vehicle is due at least in part to a propulsion system of the vehicle.

11. The method of claim 8, wherein the motion of the vehicle is due at least in part to external forces applied to the vehicle by its environment.

12. The method of claim 8, wherein the motion of the vehicle includes periodic or occasional rotation about a first axis of the vehicle, and wherein the direction from the first location of the aircraft to the first location of the moving target point is substantially aligned with the first axis.

13. The method of claim 8, wherein the motion of the vehicle includes rotation about a first axis of the vehicle and translation along the first axis.

14. The method of claim 8, wherein the motion of the vehicle is due to movement of the vehicle with respect to an irregular surface.

15. The method of claim 1, wherein the aircraft corresponds to a fixed wing aircraft.

16. The method of claim 1, wherein the guidance input includes a bank angle.

17. A system comprising:
an aircraft;
an aircraft recovery device configured to be coupled to a vehicle and configured to recover the aircraft while the vehicle is in motion; and
a guidance system comprising one or more processors, the guidance system configured to:
obtain first relative position data indicative of a direction from a first location of the aircraft at a first time to a first location of a moving target point of the aircraft recovery device at the first time;
determine, based on the first relative position data, a first location of a virtual leader based on projection of first aircraft location information onto a first virtual leader path, wherein the first virtual leader path corresponds to a straight approach path to the first location of the moving target point along a desired approach direction, the virtual leader distinct from the moving target point;
determine, based on the first location of the virtual leader, a guidance input to cause the aircraft to follow the virtual leader;
cause the aircraft to follow the virtual leader by providing the guidance input to the aircraft;
determine a second location of the virtual leader based on the first location, the first virtual leader path, and a virtual velocity associated with the virtual leader;
determine, based on the second location of the virtual leader, a second guidance input to cause the aircraft to follow the virtual leader;
obtain second relative position data indicative of a second direction from a second location of the aircraft at a second time to a second location of the moving target point at the second time;
determine, based on the second relative position data, a third location of the virtual leader based on projecting the second location of the aircraft onto a second virtual leader path; and
determine, based on the third location of the virtual leader, a third guidance input to cause the aircraft to follow the virtual leader.

18. The system of claim 17, wherein the guidance system is disposed onboard the aircraft.

19. The system of claim 17, wherein the guidance system is disposed onboard the vehicle.

20. An aircraft comprising:
a guidance system comprising one or more processors, the guidance system configured to:
obtain first relative position data indicative of a direction from a first location of the aircraft at a first time to a first location of a moving target point at the first time;
determine, based on the first relative position data, a first location of a virtual leader based on projection of first aircraft location information onto a first virtual leader path, wherein the first virtual leader path corresponds to a straight approach path to the first location of the moving target point along a desired approach direction, the virtual leader distinct from the moving target point;
determine, based on the first location of the virtual leader, a guidance input to cause the aircraft to follow the virtual leader;
cause the aircraft to follow the virtual leader by providing the guidance input to the aircraft;

determine a second location of the virtual leader based on the first location, the first virtual leader path, and a virtual velocity associated with the virtual leader;

determine, based on the second location of the virtual leader, a second guidance input to cause the aircraft to follow the virtual leader;

obtain second relative position data indicative of a second direction from a second location of the aircraft at a second time to a second location of the moving target point at the second time;

determine, based on the second relative position data, a third location of the virtual leader based on projecting the second location of the aircraft onto a second virtual leader path; and determine, based on the third location of the virtual leader, a third guidance input to cause the aircraft to follow the virtual leader.

* * * * *